United States Patent
Masuda

(10) Patent No.: US 8,233,786 B2
(45) Date of Patent: Jul. 31, 2012

(54) IMAGE SHAKE CORRECTION APPARATUS AND IMAGE PICKUP APPARATUS

(75) Inventor: Shinichi Masuda, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 203 days.

(21) Appl. No.: 12/752,743

(22) Filed: Apr. 1, 2010

(65) Prior Publication Data

US 2010/0254688 A1    Oct. 7, 2010

(30) Foreign Application Priority Data

Apr. 7, 2009  (JP) ................................ 2009-092862

(51) Int. Cl.
*G03B 17/00* (2006.01)
*H04N 5/228* (2006.01)

(52) U.S. Cl. ...................................... 396/55; 348/208.4

(58) Field of Classification Search .................... 396/55; 348/208.99, 208.4, 208.11
See application file for complete search history.

(56) References Cited

U.S. PATENT DOCUMENTS

| 5,649,237 A | 7/1997 | Okazaki |
| 2010/0215353 A1* | 8/2010 | Hashi et al. ..................... 396/55 |

FOREIGN PATENT DOCUMENTS

| JP | 07-225405 | 8/1995 |
| JP | 2004-295027 | 10/2004 |

* cited by examiner

*Primary Examiner* — W. B. Perkey
*Assistant Examiner* — Minh Phan
(74) *Attorney, Agent, or Firm* — Cowan, Liebowitz & Latman, P.C.

(57) ABSTRACT

Provided is an image shake correction apparatus including: an image taking optical system for taking an image of a subject; an angular velocity detection unit for detecting an angular velocity applied to the apparatus and outputting a first signal; an acceleration detection unit for detecting an acceleration applied to the apparatus and outputting a second signal; an axial rotation angular velocity calculation unit for calculating an axial rotation angular velocity component about a principal point of the image taking optical system based on the first signal; a revolution angular velocity calculation unit for calculating a revolution angular velocity component about the subject based on the second signal and a result of the calculating by the axial rotation angular velocity calculation unit; and a control unit for performing image shake correction control based on a difference between the axial rotation angular velocity component and the revolution angular velocity component.

16 Claims, 18 Drawing Sheets

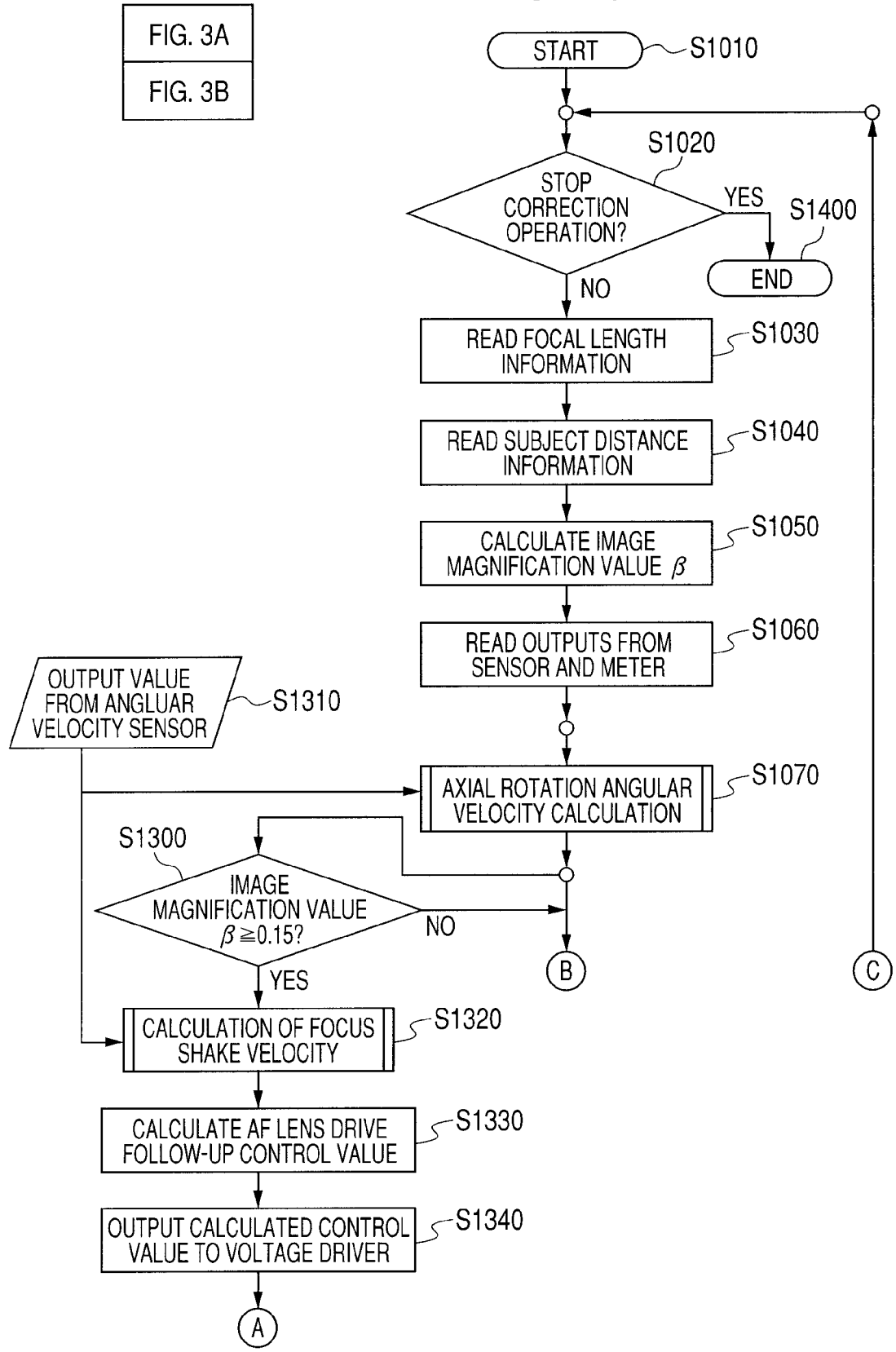

IMAGE SHAKE CORRECTION APPARATUS AND IMAGE PICKUP APPARATUS

BACKGROUND OF THE INVENTION

1. Field of the Invention

The present invention relates to an image shake correction apparatus capable of preventing a taken image from degrading by correcting an image shake due to a hand-held shake or the like, and to an image pickup apparatus including the image shake correction apparatus.

2. Description of the Related Art

FIG. 16 is a diagram illustrating an outline of an image shake correction apparatus included in a conventional camera. A shake generated in the camera has a total of six degrees of freedom, i.e., a rotational movement with three degrees of freedom which includes pitching A, yawing B, and rolling C movements and a translational movement with three degrees of freedom which includes movements in X axis, Y axis, and Z axis directions. A currently-commercialized image shake correction apparatus normally corrects a shake due to a rotational movement with two degrees of freedom which includes the pitching and yawing movements that exert a large influence on image shake correction.

A shake of the camera is monitored by an angular velocity sensor 130. Normally, as the angular velocity sensor 130, an angular velocity sensor of a piezoelectric vibration type for detecting a Coriolis force generated by a rotation is used. Three detection units are built into the angular velocity sensor 130. The three detection units detect a pitching shake A that is a rotation about a Z axis of FIG. 16, a yawing shake B that is a rotation about a Y axis of FIG. 16, and a rolling shake C that is a rotation about an X axis (optical axis) of FIG. 16.

In performing correction of an image shake due to a hand-held shake or the like, an output from the angular velocity sensor 130 is sent to a lens CPU 106, and a target drive position of a correction lens 101 for image shake correction is calculated. Instruction signals are sent to voltage drivers 161x and 161y in order to drive the correction lens 101 to the target drive position, and the voltage drivers 161x and 161y drive lens drive units 120x and 120y, respectively, according to the instruction signals. A position of the correction lens 101 is monitored by lens position detection units 110x and 110y, and fed back to the lens CPU 106. The lens CPU 106 performs position control for the correction lens 101 based on the target drive position and the position of the correction lens 101. An image shake caused by a hand-held shake or the like can be corrected by thus driving a correction lens according to a shake.

However, in the above-mentioned image shake correction apparatus, detection of a shake such as a hand-held shake is performed only by the angular velocity sensor 130. Therefore, an angle shake (rotation shake) can be monitored, but a shake that causes the optical axis to move up and down and left and right in parallel (hereinafter, referred to as "parallel shake") cannot be monitored. Accordingly, the image shake correction can be performed only for the shake due to the movement with the two degrees of freedom that includes the pitching and yawing movements.

Here, an image shake caused by the parallel shake is described by taking an example of performing image taking by using a microlens having a focal length of 100 mm. In a case where the lens is used to take an image of scenery at an infinite distance, assuming that the output from the angular velocity sensor is equivalent to 0.8 deg/s, an image plane moving velocity is approximately 1.40 mm/s (=100×sin 0.8) from the focal length. Therefore, when an image is taken at an exposure time of 1/15 s, a shake width of an image plane caused by the angle shake is 93 μm (=1.40 mm/15). Further, an entirety of the camera may perform a parallel movement in a vertical direction at 1.0 mm/s in addition to the above-mentioned angle shake. In such a case, an image taking magnification value R used for taking an image at the infinite distance is substantially zero. Hence, there is no influence of a parallel moving velocity component, and hence an image shake caused by the parallel shake is not generated.

However, the image taking magnification used for taking a close-up image of a flower or the like is extremely large, which does not allow ignoring the influence of the parallel shake. For example, if an image is taken at the same image taking magnification (R=1) with a vertical moving velocity of 1 mm/s, the image plane also has an image moving velocity of 1 mm/s. When an image is taken at the exposure time of 1/15 s, the shake width in the image plane is 67 μm, and hence the image shake caused by the parallel shake can no longer be ignored.

Next, a general method (model or equation) for expressing the movement of an object in a space in terms of physics/engineering is described. Here, for the sake of simplicity, a general model for expressing the movement of an object on a plane is described. In this case, by defining three degrees of freedom of the object, the movement or the position of the object can be uniquely defined.

FIGS. 17A and 17B illustrate a first model for expressing the movement by the translational movement and the rotational movement. In a fixed coordinate system O-XY of a plane with a lateral axis set as the X axis and the axis orthogonal thereto set as the Y axis, as illustrated in FIG. 17A, the position of the object can be defined by specifying the three degrees of freedom including the position X(t) in the X axis direction, the position Y(t) in the Y axis direction, and a rotational angle θ(t) of the object itself. As illustrated in FIG. 17B, the movement (velocity vector) of the object can be expressed by three components including a translational velocity in the X axis direction Vx(t) of a reference point set on the object, a translational velocity in the Y axis direction Vy(t) of the reference point, and a rotational angular velocity θ'(t) about the reference point on the object. The above-mentioned model is most general.

FIG. 18 illustrates a second model for expressing the movement by an instant rotational center and a rotational radius. It is assumed that the object is revolving about an instant rotational center of a given point f(t)=(X(t),Y(t)) at the rotational radius R(t) with a rotation velocity θ'(t) in the fixed coordinate system O-XY of an XY plane at a given instant. In such a manner, the movement in a plane can be expressed by a locus of the instant rotational center f(t) and the rotation velocity θ'(t) at the instant. The above-mentioned model is often used for analysis of a link mechanism of mechanics.

In recent years, Japanese Patent Application Laid-Open No. H07-225405 and Japanese Patent Application Laid-Open No. 2004-295027 disclose cameras for correcting the parallel shake. In Japanese Patent Application Laid-Open No. H07-225405, a camera shake movement in a three-dimensional space may be expressed by the translational movement and the rotational movement based on measured values of three accelerometers and three angular velocity sensors.

Further, in Japanese Patent Application Laid-Open No. 2004-295027, as illustrated in FIG. 2 thereof, a distance n from a focal plane of a rotation center is calculated for a camera shake including the angle shake and the parallel shake. By Equation 1 of Japanese Patent Application Laid-Open No. 2004-295027, an amount of an angle shake generated when the focal plane is set as the rotation center is calculated in the first half, and an amount of the parallel shake generated due to the parallel movement is calculated in the second half. The parallel shake amount in the second half is a correction term considered in terms of the rotation at the position spaced apart from the focal plane by the distance n. As illustrated in FIG. 3 of Japanese Patent Application Laid-Open No. 2004-295027, the position n of the rotation center is obtained by using an instant center, which is a conception often used in mechanics, as the model for expressing the movement in a space. The above-mentioned conception is that the movement in a space can be expressed by continuous rotational movements, in which a rotational movement about a given point at a given radius at the instant is followed by a rotational movement about a subsequent given point at a given radius at the subsequent instant. Therefore, in the model disclosed in Japanese Patent Application Laid-Open No. 2004-295027, the camera shake movement may be expressed as the continuous rotational movements having the instant center.

However, the method disclosed in Japanese Patent Application Laid-Open No. H07-225405 raises a problem that an enormous amount of calculation is necessary to obtain the amount of the shake in the image plane and that an algorithm for the calculation may be extremely complicated. Further, there is no description of calculation for correcting a focus shake. Further, in the model disclosed in Japanese Patent Application Laid-Open No. 2004-295027, as described above, the camera shake movement may be expressed as the continuous rotational movements having the instant center. However, the model and the equation present such a problem as described in the paragraph "0047" of Japanese Patent Application Laid-Open No. 2004-295027. That is, the calculation cannot be performed because the position n of the rotation center is ∞ if F1≈F2 (forces applied to two acceleration sensors). Further, the position n of the rotation center being ∞ indicates that no shake is caused by an angle in a pitching direction or a yawing direction, and such a shake cannot be detected by the angular velocity sensor 30. It is also possible to calculate a correction amount by using outputs from the two acceleration sensors, but its accuracy is low, and an enormous amount of the calculation is necessary. Further, the equation described in Japanese Patent Application Laid-Open No. 2004-295027 is not capable of calculating a focus shake.

SUMMARY OF THE INVENTION

The present invention has been made in view of the above-mentioned problem, and therefore has an object to provide an apparatus and a method which allow accurate image shake correction in which control thereof does not fail no matter how an angle shake and a parallel shake coexist, and therefore are capable of reducing an amount of calculation.

In order to achieve the above-mentioned object, according to one aspect of the present invention, there is provided an image shake correction apparatus including; an image taking optical system for taking an image of a subject, an angular velocity detection unit for detecting an angular velocity applied to the image shake correction apparatus and outputting the angular velocity, an acceleration detection unit for detecting an acceleration applied to the image shake correction apparatus and outputting the acceleration, an axial rotation angular velocity calculation unit for calculating an axial rotation angular velocity component about a principal point of the image taking optical system based on the outputting from the angular velocity detection unit, a revolution angular velocity calculation unit for calculating a revolution angular velocity component about the subject based on the outputting from the acceleration detection unit and a result of the calculating by the axial rotation angular velocity calculation unit; and a control unit for performing image shake correction control based on a difference between the axial rotation angular velocity component and the revolution angular velocity component.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Exemplary embodiments for carrying out the present invention are described below as first and second embodiments.

First Embodiment

In the following embodiment, a shake movement of a camera held with a hand of a person and an image shake movement generated on an image plane as a result of the shake movement of the camera are expressed by an "axial-rotation-and-revolution shake equation" that is a merger between a movement model for expressing the movement by an axial rotation movement and a revolution movement and a geometrical-optical equation.

This embodiment relates to an image shake correction apparatus for calculating a camera shake movement from measured values of an accelerometer and an angular velocity sensor and the axial-rotation-and-revolution shake equation and further calculating the image shake movement. Then, a part of image taking lenses or a part or all of image pickup elements are controlled to be driven based on a calculated value of the image shake movement to thereby correct a shake of an image. Alternatively, the image shake correction apparatus corrects the shake of the image by subjecting a taken image to an image processing based on the calculated value of the image shake movement obtained from the axial-rotation-and-revolution shake equation.

Figure 1:
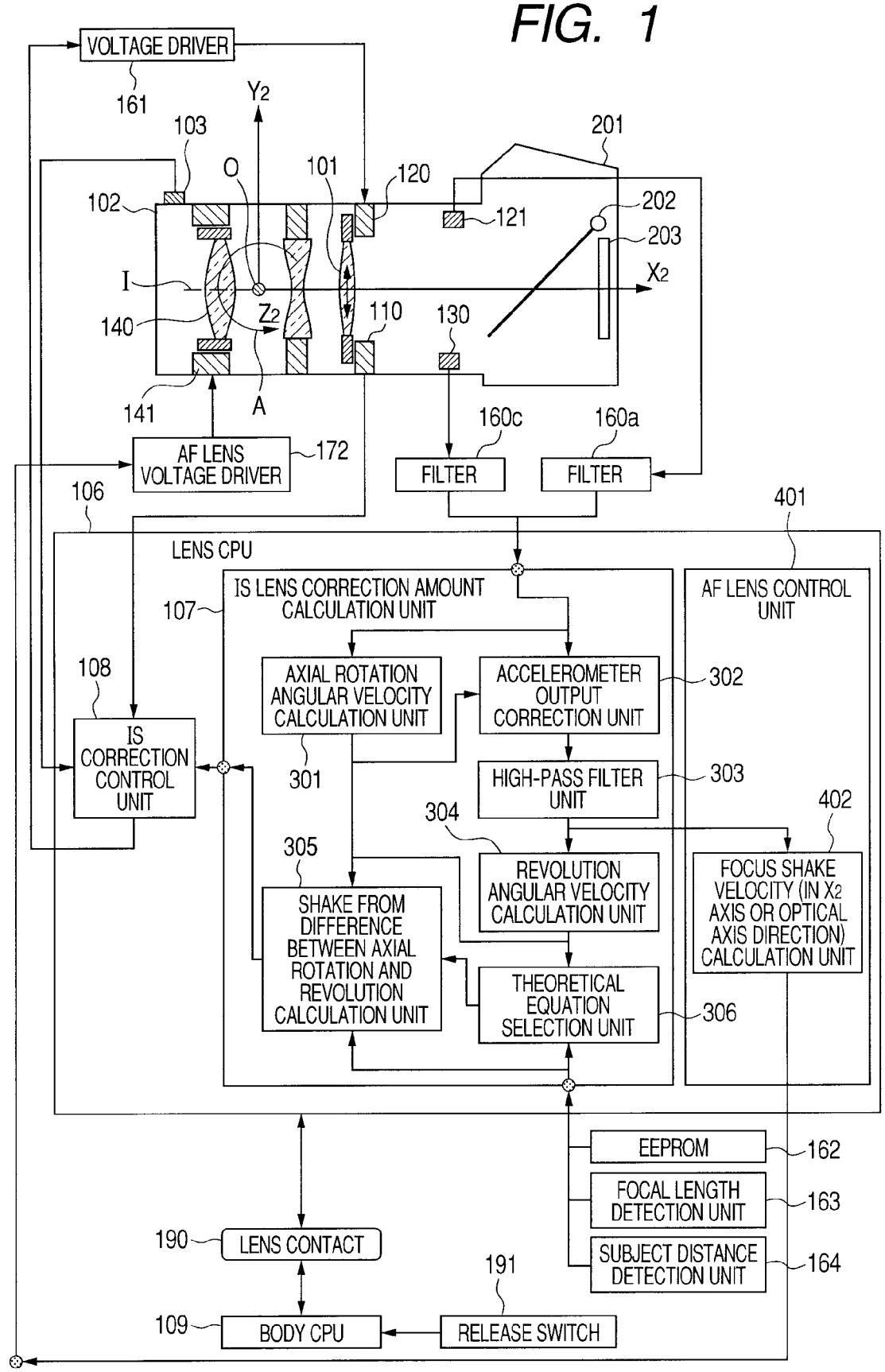
FIG. 1 is a structural diagram illustrating a configuration of a main part of an image pickup apparatus according to a first embodiment of the present invention.

FIG. 1 is a structural diagram illustrating a configuration of a main part of an image pickup apparatus (camera system) including the image shake correction apparatus according to the first embodiment of the present invention. Note that components having the same functions as those of the above-mentioned conventional example are denoted by the same reference symbols, and repetitive description is appropriately avoided.

The image shake correction apparatus according to the first embodiment is provided within a lens barrel 102 that is detachably attached to a camera body 201. The image shake correction apparatus performs shake correction in directions of five degrees of freedom including pitching (rotation about a $Z_2$ axis), yawing (rotation about a $Y_2$ axis), a $Y_2$ axis direction, a $Z_2$ axis direction, and an $X_2$ axis (optical axis) direction. However, in FIG. 1 and the following description, the illustration is made regarding an image shake correction system for pitching rotation and the $Y_2$ axis direction and a focus shake correction system for the $X_2$ axis (optical axis) direction. The same illustration as that of the image shake correction system for the pitching rotation and the $Y_2$ axis direction applies to yawing rotation and an image shake correction system for the $Z_2$ axis direction.

An angular velocity sensor 130 represents an angular velocity detection unit that is float-supported within the lens barrel 102, for detecting an angular velocity of a shake generated in the camera body 201 (lens barrel 102). The angular velocity sensor 130 according to the first embodiment is set as an angular velocity sensor of a piezoelectric vibration type for detecting a Coriolis force generated by a rotation. The angular velocity sensor 130 is an angular velocity sensor having in an inside thereof a sensitive axis with respect to three-axis rotation of pitching, yawing, and rolling. The angular velocity sensor 130 is float-supported in order to reduce an influence of mechanical vibrations caused by mechanical actions of the camera to a minimum. The angular velocity sensor 130 outputs an angular velocity signal corresponding to the detected angular velocity to a filter 160c.

An accelerometer 121 represents an acceleration detection unit for detecting an acceleration of the shake generated in the camera body 201 (lens barrel 102). The accelerometer 121 according to the first embodiment is a three-axis accelerometer having three sensitive axes with respect to three directions of an X axis, a Y axis, and a Z axis, and is float-supported within the lens barrel 102. In the same manner as the angular velocity sensor 130, the accelerometer 121 is also float-supported in order to reduce the influence of the mechanical vibrations caused by the mechanical actions of the camera to a minimum. Further, the accelerometer 121 is a three-axis acceleration sensor (acceleration sensor using a weight body) in this embodiment, in which frequency characteristics of two axes are equally high, but the remaining one axis exhibits an inferior characteristic. Therefore, two axes having high sensitivity are used in order to detect the acceleration in the $Y_2$ axis direction and the $Z_2$ axis direction that are orthogonal to the optical axis, and the $X_2$ axis (optical axis direction) is set as the one axis having inferior characteristics. This is because accelerations in the $Y_2$ axis direction and the $Z_2$ axis direction which exert a large influence on image shake correction are detected with high accuracy.

An output from the accelerometer 121 is passed through a low-pass filter (LPF) such as a filter 160a, A/D-converted, and input to a shake correction lens correction amount calculation unit 107 included in a lens CPU 106. Note that the accelerometer 121 may be attached to a moving mirror frame that moves in the optical axis direction upon zooming. In this case, it is necessary to detect the position of the accelerometer 121 with respect to the position of a principal point after the zooming.

Further, the angular velocity sensor 130 is of a vibration gyro type as described above, and is vibrating at approximately 26 KHz. Therefore, if the accelerometer 121 and the angular velocity sensor 130 are implemented on the same substrate, there is a fear that the accelerometer may pick up vibration noise of the angular velocity sensor 130. For this reason, the accelerometer 121 and the angular velocity sensor 130 are implemented on different substrates.

A shake correction lens drive unit 120 represents a drive unit (actuator) for generating a driving force for driving a correction lens 101 for an image shake in directions perpendicular to an optical axis I (on a $Y_2Z_2$ plane). When a coil (not shown) is energized by a drive current output by a voltage driver 161, the shake correction lens drive unit 120 generates the driving force in the $Y_2$ axis direction and drives the correction lens 101.

A lens position detection unit 110 represents an optical position detection unit for detecting the position of the correction lens 101 in the direction perpendicular to the optical axis I. The lens position detection unit 110 monitors a current position of the correction lens 101, and feeds back information on the current position of the correction lens 101 to a shake correction control unit 108 via an A/D converter.

The lens CPU 106 represents a central processing unit for performing various kinds of control on a lens barrel 102 side. The lens CPU 106 calculates a focal length based on a pulse signal output by a focal length detection unit 163, and calculates a distance from a subject based on a pulse signal output by a subject distance detection unit 164. Further, the lens CPU 106 includes therein the shake correction lens correction amount calculation unit 107, the shake correction control unit 108, and an AF lens control unit 401. The lens CPU 106 can communicate with a body CPU 109 via a lens contact 190 provided between the lens barrel 102 and the camera body 201. An image shake correction start command is sent from the body CPU 109 to the lens CPU 106 in synchronization with halfway depression of a release switch 191 being turned on. Further, an image shake correction stop command is sent from the body CPU 109 to the lens CPU 106 in synchronization with halfway depression of the release switch 191 being turned off.

Further, the lens CPU 106 monitors a state of a shake correction switch (SW) 103 provided to the lens barrel 102. If the shake correction switch 103 is in an on state, image shake correction control is performed, and if the shake correction switch 103 is in an off state, the image shake correction start command from the body CPU 109 is ignored and the shake correction is not performed.

The shake correction lens correction amount calculation unit 107 represents a part for converting output signals from the filters 160a and 160c into target velocity information used for driving the correction lens 101 to a target position. The shake correction lens correction amount calculation unit 107 is connected to the shake correction control unit 108, the filters 160a and 160c, an EEPROM 162, the focal length detection unit 163, and the subject distance detection unit 164. The AF lens control unit 401 includes a focus shake velocity (in the $X_2$ axis or optical axis direction) calculation unit 402 for performing calculation for performing focus shake correction by using an output value of the accelerometer from the shake correction lens correction amount calculation unit 107, and outputs a result of the calculation to an AF lens voltage driver 172.

An AF lens 140 can be driven in the optical axis direction by an AF lens drive unit 141 that uses an ultrasonic motor or a stepping motor as a drive source. The AF lens voltage driver 172 generates a voltage for controlling the AF lens drive unit 141 to be driven.

The shake correction lens correction amount calculation unit 107 captures output signals (analog signals) from the accelerometer 121 and the angular velocity sensor 130 via the filters 160a and 160c, respectively, after the output signals are quantized by A/D-conversion. Then, the output signal is converted into a target drive velocity of the correction lens 101 based on focal length information obtained from the focal length detection unit 163, subject distance information obtained from the subject distance detection unit 164, and information unique to the lens which is written in the EEPROM 162. A conversion method (calculation method) for a target drive position which is performed by the shake correction lens correction amount calculation unit 107 is described in detail later. A target velocity signal, which represents information on the target drive velocity calculated by the shake correction lens correction amount calculation unit 107, is output to the shake correction control unit 108.

The shake correction control unit 108 controls the shake correction lens drive unit 120 through the intermediation of the voltage driver 161, and performs follow-up control so that the correction lens 101 is driven according to the information on the target drive velocity. The shake correction control unit 108 captures a position detection signal (analog signal) output by the lens position detection unit 110 after the position detection signal is converted into a digital signal. In this embodiment, the following two items are input to the shake correction control unit 108:

the target velocity signal converted into the target drive velocity of the correction lens 101, which is an output from the shake correction lens correction amount calculation unit 107; and position information on the correction lens 101 which is obtained by the lens position detection unit 110.

Under control of the shake correction control unit 108, velocity control is performed by using a deviation between the target drive velocity of the correction lens 101 and actual velocity information thereon. The shake correction control unit 108 calculates a digital drive signal based on the target drive velocity, the velocity information on the correction lens 101, and the like, and outputs the digital drive signal to the voltage driver 161.

Alternatively, under the control of the shake correction control unit 108, known PID control may be used. The PID control is performed by using a deviation between target position information on the correction lens 101 and the position information thereon. Then, the shake correction control unit 108 calculates the drive signal based on the target position information, the position information on the correction lens 101, and the like, and outputs the digital drive signal to the voltage driver 161.

The filters 160a and 160c represent filters for removing predetermined frequency components from the signals output from the accelerometer 121 and the angular velocity sensor 130, respectively, and cut a noise component and a DC component included in a high-frequency band. Then, the filters 160a and 160c A/D-convert the signals from which the predetermined frequency components have been removed, and then outputs the signals to the shake correction lens correction amount calculation unit 107.

The voltage driver 161 represents a driver unit for supplying power to the shake correction lens drive unit 120 according to the input drive signal (drive voltage). The voltage driver 161 performs switching on the drive signal, and applies a voltage to the shake correction lens drive unit 120 to perform the driving of the shake correction lens drive unit 120.

The EEPROM 162 represents a nonvolatile storage unit for storing lens data indicating various kinds of unique information regarding the lens barrel 102 and a coefficient used for converting the pulse signal output by the subject distance detection unit 164 into a physical amount.

The focal length detection unit 163 represents a zoom encoder for detecting the focal length. The focal length detection unit 163 outputs the pulse signal corresponding to a value of the focal length to the shake correction lens correction amount calculation unit 107. The subject distance detection unit 164 represents a focus encoder for detecting the distance from the subject. The subject distance detection unit 164 detects a position of an image taking optical system (focusing lens), and outputs the pulse signal corresponding to the position to the shake correction lens correction amount calculation unit 107.

The body CPU 109 represents a central processing unit for performing various kinds of control over the entire camera system. The body CPU 109 sends the image shake correction start command to the lens CPU 106 based on an on operation of the release switch 191, sends the image shake correction stop command to the lens CPU 106 based on an off operation of the release switch 191, and performs other kinds of processing. The body CPU 109 receives an input of information on the release switch 191, and can detect which of the halfway depression and full depression is operated on the release button (not shown). Note that the release switch 191 causes a series of image taking preparation operations to start upon detection of the halfway depression operated on the release button (not shown), and causes an image taking operation to start upon detection of the full depression operated on the release button.

Next, the units within the shake correction lens correction amount calculation unit 107 are described in detail.

Figure 2:
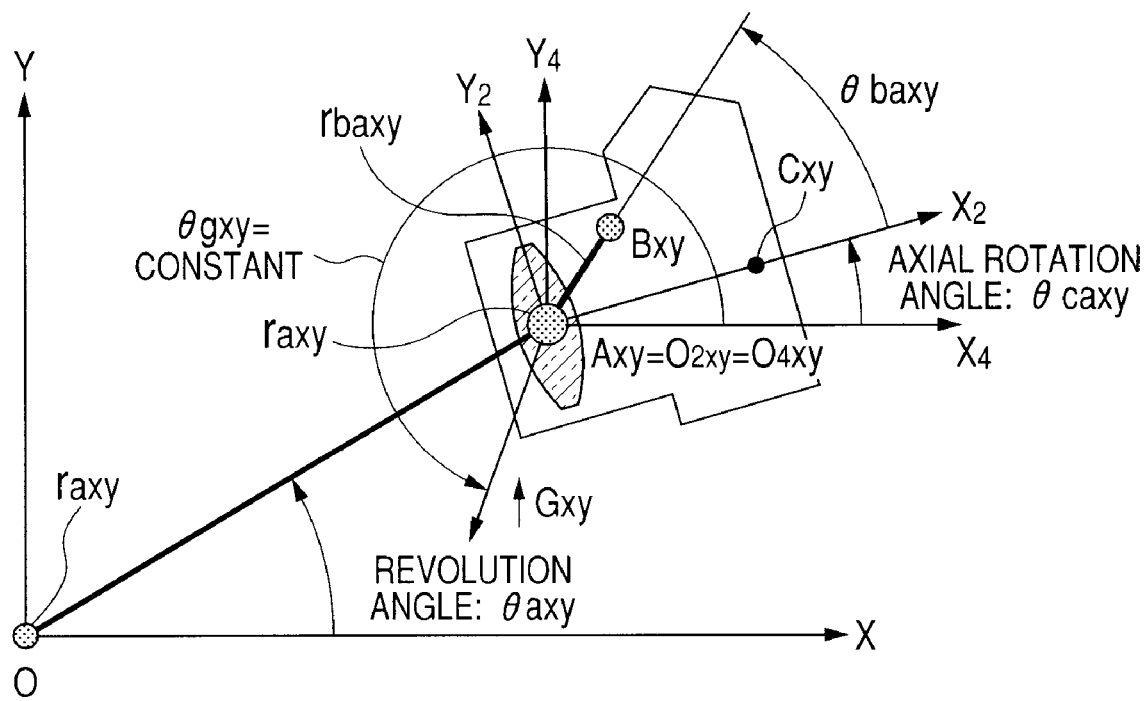
FIG. 2 is a simplified diagram of a state in which a camera is projected onto an XY plane according to the first embodiment.

FIG. 2 is a simplified diagram of a state in which the camera is projected onto an XY plane. FIG. 2 illustrates contours of the camera and the lens as well. FIG. 2 illustrates within the camera a principal point $A_{xy}$ of the optical system, the accelerometer $B_{xy}$, and a center $C_{xy}$ of an image pickup element 203.

An original point $O_4$ of a coordinate system $O_4$-$X_4Y_4$ is fixed at the principal point $A_{xy}$ of the optical system. Even when the principal point $A_{xy}$ moves, an $X_4$ axis and a $Y_4$ axis are kept parallel with the X axis and the Y axis, respectively. The principal point $A_{xy}$ is a principal point of an entire optical system of lens barrel 102 used for imaging a subject image on the image pickup element 203. An original point $O_2$ of a coordinate system $O_2$-$X_2Y_2$ is fixed at the principal point $A_{xy}$, and moves integrally with the camera. In this case, the $X_2$ axis is caused to coincide with the optical axis of the camera at all times.

An angle formed by a rotation about the original point $O_2$ from the $X_4$ axis to the $X_2$ axis is set as an axial rotation angle $\theta_{caxy}$. An angle formed by a rotation about an original point O from the X axis to a scalar $r_{axy}$ is set as a revolution angle $\theta_{axy}$. The scalar $r_{axy} \approx (1+\beta)f/\beta$ is a subject-side focal length, where $\beta$ represents an image magnification value.

A gravity acceleration vector $\uparrow G_{xy}$ at the principal point $A_{xy}$ indicates a positive rotation (counterclockwise) about the principal point $A_{xy}$ from the $X_4$ axis, and an angle formed by a rotation from the $X_4$ axis to the vector $\uparrow G_{xy}$ is set as $\theta_{gxy}$. The value $\theta_{gxy}$ is constant.

An axial rotation angular velocity calculation unit 301 calculates an axial rotation angular velocity $\theta'_{caxy}$ based on an output value from the angular velocity sensor. The axial rotation angular velocity $\theta'_{caxy}$ is obtained by calculating an axial rotation angular velocity component about the principal point of the image taking optical system from the angular velocity applied to one of the lens barrel 102 and the camera body 201. The axial rotation angular velocity generally has a linear relationship with the output value from the angular velocity sensor, and can therefore be obtained by multiplying the output value by a coefficient.

An accelerometer output correction unit 302 substantially obtains a value only of the third term ($=jr_{axy}\ddot{\theta}_{axy}$: revolution angular acceleration) by eliminating the fourth to seventh terms of Equation 27 described below based on an output value $A_{ccy2(O-X2Y2)}$ from the accelerometer and the axial rotation angular velocity $\theta'_{caxy}$. Note that the apostrophe (') represents a first-order differentiation, and the dieresis (¨) represents a second-order differentiation.

A high-pass filter unit 303 represents a filter that allows a frequency component necessary for correction of a hand-held shake to pass therethrough. A revolution angular velocity calculation unit 304 obtains a revolution angular acceleration $\ddot{\theta}_{axy}$ by dividing a revolution angular velocity $jr_{axy}\ddot{\theta}_{axy}$, which is an input value from the high-pass filter unit 303, by the subject-side focal length $r_{axy}$. In addition, a revolution angular velocity $\theta'_{axy}$ necessary for the control is obtained by performing time integration on the revolution angular acceleration.

A shake-from-difference-between-axial-rotation-and-revolution calculation unit 305 substitutes:
the read image magnification value $\beta$;
a real focal length value f;
the axial rotation angular velocity $\theta'_{caxy}$ calculated in real time; and
the revolution angular velocity $\theta'_{axy}$
into Equation 15 described later:

$$A_{ccy2(O-X2Y2)} \approx -(1+\beta)f(\theta'_{caxy} - \theta'_{axy})e^{j(\pi/2)}$$

to thereby calculate an image shake velocity $V_{dcxy(O2-X2Y2)}$ in a $Y_2$ direction on an image pickup surface of the image pickup element 203. The obtained image shake velocity $V_{dcxy(O2-X2Y2)}$ is set as the target drive velocity. An image shake velocity $V_{dczx(O2-Z2X2)}$ in a $Z_2$ direction on the image pickup surface can be similarly obtained from Equation 16 described later, but description thereof is omitted herein.

A theoretical equation selection unit 306 selects an equation to be used for correction calculation according to a ratio of the revolution angular velocity to the axial rotation angular velocity. The selection is made between the equation for correcting a shake from a difference between the axial rotation and the revolution, which uses a difference between the axial rotation angular velocity and the revolution angular velocity, and the equation for correcting an axial rotation shake, which uses only the axial rotation angular velocity.

—Meaning and Usage Method of Axial-Rotation-and-Revolution Shake Equation: Equation 15—

In the first embodiment, components of a camera shake in the XY plane (pitching angle shake and parallel shake in the $Y_2$ direction) are expressed by the axial-rotation-and-revolution shake equation, and an approximation equation Equation 15 therefor is used to obtain an image shake velocity in the $Y_2$ direction on the image pickup surface (image shake velocity in a longitudinal direction on the image pickup surface). Note that in the present invention, a "vector R" is represented by "$\uparrow R$". A general representation of the vector is "R" with the symbol "→" thereover, but "$\uparrow R$" is used for the convenience of document preparation.

$$\rightarrow V_{dcxy(O2-X2Y2)} \approx -(1+\beta)f(\theta'_{caxy} - \theta'_{axy})e^{j(\pi/2)} \quad <\text{Equation 15}>$$

where:

$\uparrow V_{dcxy(O2-X2Y2)}$: an image shake velocity vector on the image pickup surface;

$\beta$ the image magnification value [(no units)] of the image taking lens of the camera at a time of the image shake correction;

f: the real focal length [mm] of the image taking lens of the camera at the time of the image shake correction; $(1+\beta)f$: an image-side focal length [mm];

$\theta'_{caxy}$: the axial rotation angular velocity [rad/second], which is a time differential value of the axial rotation angle $\theta_{caxy}$ about a principal point A;

$\theta'_{axy}$: the revolution angular velocity [rad/second], which is a time differential value of the revolution angle $\theta_{axy}$ about the original point O; and $e^{j(\pi/2)}$: a polar coordinate system representation in which the $(\pi/2)$-th power indicates here that the image shake velocity vector is a direction rotated from the $X_2$ axis (optical axis) by 90 degrees.

Equation 12 is an exact equation without approximation for the image shake velocity vector $\uparrow V_{dcxy(O2-X2Y2)}$ in a moving coordinate system $O_2$-$X_2Y_2$ in a given XY plane in Equation 15. The exact equation Equation 12 may be used to perform the image shake correction with more accuracy. Here, $r_{axy} \approx (1+\beta)f/\beta$ is the subject-side focal length.

The approximation equation means that the image shake velocity in the $Y_2$ direction on the image pickup surface is $-$(image-side focal length)×(value obtained by subtracting the revolution angular velocity from the axial rotation angular velocity).

$$\uparrow V_{dcxy(O2-X2Y2)} = [fr'_{axy}(r_{axy} - f)^{-1} - \qquad <\text{Equation 12}>$$
$$fr_{axy}r'_{axy}(r_{axy} - f)^{-2}]e^{j(\theta_{axy} - \theta_{caxy})} +$$
$$fr'_{axy}(r_{axy} - f)^{-1}\theta'_{axy}e^{j(\theta_{axy} + \Pi/2 - \theta_{caxy})} -$$
$$(1+\beta)f\theta'_{caxy}e^{j(\Pi/2)}$$

In the same manner as in the XY plane, components of a camera shake on a ZX plane (yawing angle shake and parallel shake in the $Z_2$ direction) are expressed by the axial-rotation-and-revolution shake equation, and an approximation equation, Equation 16 therefor, is used to obtain an image shake velocity in the $Z_2$ direction on a surface of an image pickup element (image shake velocity in a lateral direction) on the image pickup surface. This has the same meaning as Equation 15 described above, and hence description thereof is omitted here.

Next, components included in the output from the accelerometer 121 are described. Here, items necessary for the image shake correction are described. A procedure for deriving the equation is described later.

The output $A_{ccy2(O-X2Y2)}$ from the accelerometer in the $Y_2$ axis direction, which is used in order to obtain the revolution angular velocity $\theta'_{axy}$, is represented by Equation 27.

$$A_{ccy2(O-X2Y2)} \approx \qquad \qquad <\text{Equation 27}>$$
$$jr_{axy}\ddot{\theta}_{axy}(\text{third term: acceleration of revolution}) +$$
$$j2r'_{axy}\theta'_{axy}(\text{fourth term: Coriolis force}) +$$
$$jr_{baxy}(\theta'_{caxy})^2 \sin(\theta_{baxy} + \Pi)$$
$$(\text{fifth term: centripetal force of axial rotation}) +$$
$$jr_{baxy}\ddot{\theta}_{caxy}\sin(\theta_{baxy} + \Pi/2)$$
$$(\text{sixth term: acceleration of axial rotation}) +$$
$$jG \cdot \sin(\theta_{gxy} - \Pi)$$
$$(\text{seventh term: gravity acceleration component})$$

The third term $jr_{axy}\ddot{\theta}_{axy}$ in Equation 27 described above represents a component necessary to obtain the revolution angular velocity $\theta'_{axy}$, which is to be obtained in the first embodiment. The revolution angular velocity $\theta'_{axy}$ is obtained by dividing the third term by known $r_{axy}$ and integrating the resultant. The fourth to seventh terms are unnecessary for the calculation, and if not eliminated, become error components in obtaining the revolution angular velocity $\theta'_{axy}$. The fourth term $j2r'_{axy}\theta'_{axy}$ represents a Coriolis force, and is a term that can be ignored because $r'_{axy} \approx$ zero if a shake in the optical axis direction of the camera is small in amount. Further description is made of Equation 27 later.

The fifth and sixth terms are error components included in the output $A_{ccy2(O-X2Y2)}$ from the accelerometer because the accelerometer 121 cannot be located at an ideal position of the principal point A and is located at a position B instead. The fifth term $jr_{baxy}(\theta'_{caxy})^2 \sin(\theta_{baxy}+\pi)$ represents a centripetal force generated due to the accelerometer 121 revolving about the principal point A. The values $r_{baxy}$ and $\theta_{baxy}$ are coordinates of the position B to which the accelerometer 121 is attached, and are known. The value $\theta'_{caxy}$ is the axial rotation angular velocity, and is a value that can be measured by the angular velocity sensor 130 attached to the camera. Therefor, the value of the fifth term can be calculated.

The sixth term $jr_{baxy}\ddot{\theta}_{caxy}\sin(\theta_{baxy}+\pi/2)$ represents an acceleration component for a case where the accelerometer 121 revolves about the principal point A, and the values $r_{baxy}$ and $\theta_{baxy}$ are coordinates of the position B at which the accelerometer 121 is attached, and are known. The value $\ddot{\theta}_{caxy}$ can be calculated by differentiating the value of the angular velocity sensor 130 attached to the camera. Therefor, the value of the sixth term can be calculated.

The seventh term $jG \cdot \sin(\theta_{gxy}-\pi)$ represents an influence of a gravity acceleration, and can be used as a constant in the approximation equation. Therefore, the seventh term can be eliminated by filtering process of a circuit.

The output $A_{ccx2(O-X2Y2)}$ from the accelerometer in the $X_2$ axis direction being the optical axis, which is used for the focus shake correction, is represented by Equation 26.

$$A_{ccx2(O-X2Y2)} \approx \qquad \qquad <\text{Equation 26}>$$
$$\ddot{r}_{axy}(\text{first term: focus shake}) - r_{axy}(\theta'_{axy})^2$$
$$(\text{second term: centripetal force of revolution}) +$$
$$r_{baxy}(\theta'_{caxy})^2 \cos(\theta_{baxy} + \Pi)$$
$$(\text{fifth term: centripetal force of axial rotation}) +$$
$$r_{baxy}\ddot{\theta}_{caxy}\cos(\theta_{baxy} + \Pi/2)$$
$$(\text{sixth term: acceleration of axial rotation}) +$$
$$G \cdot \cos(\theta_{gxy} - \Pi)$$
$$(\text{seventh term: gravity acceleration component})$$

Only the first term $\ddot{r}_{axy}$ (acceleration in the optical axis direction) is necessary for the focus shake correction in Equation 26. The second and fifth to seventh terms are components unnecessary for the focus shake correction, and if not eliminated, become error components in obtaining the acceleration $\ddot{r}_{axy}$ in the $X_2$ axis direction being the optical axis. The second and fifth to seventh terms can be eliminated by the same method as Equation 27. Equation 26 is described later.

—Description of Flowchart—

Figure 3B:
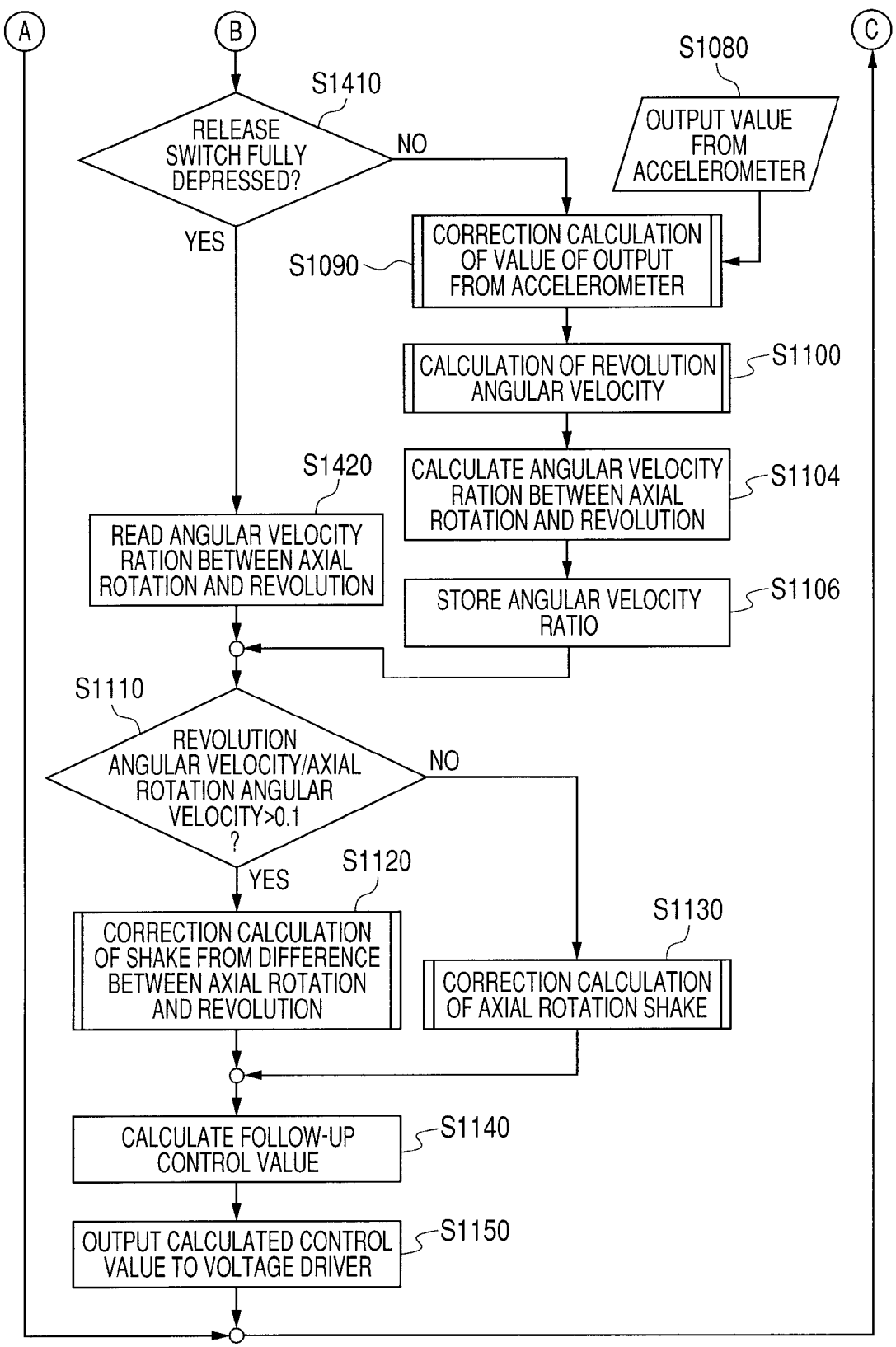
FIG. 3 is comprised of FIGS. 3A and 3B showing flowcharts illustrating an operation of the image pickup apparatus according to the first embodiment.

FIGS. 3A and 3B are flowcharts illustrating a flow of a correction-lens-related operation of the image shake correction apparatus according to the first embodiment. Hereinafter, an operation regarding correction amount calculation for the correction lens 101 is described with reference to FIGS. 3A and 3B.

In Step 1010 (hereinafter, referred to simply as "S1010"), a correction start command is output from the camera body 201 with the shake correction SW 103 in an on state and the halfway depression of the release switch 191 being turned on. Upon reception of the correction start command, a shake correction operation is started.

In S1020, it is determined whether or not the image shake correction stop command is output from the camera body 201. If the image shake correction stop command is output, the procedure advances to S1400, in which the shake correction operation is stopped. If the image shake correction stop command is not output, the procedure advances to S1030, in which the shake correction operation is continued. Therefore, until the image shake correction stop command is output from the camera body 201, the shake correction operation is set to be continued.

In S1030, a numerical value obtained from the focal length detection unit 163 is read. The numerical value from the focal length detection unit 163 is used for the calculation of the image magnification value R. In S1040, a numerical value obtained from the subject distance detection unit 164 is read. In S1050, the calculation of the image magnification value β is performed based on the numerical value from the focal length detection unit 163 and the numerical value from the subject distance detection unit 164. The calculation of the image magnification value β is expressed by an equation unique to the structure of the optical system, and the calculation is performed based on the equation for image magnification calculation. Note that the calculation of the image magnification value does not particularly necessitate the calculation by the equation, and may be stored as a table of the focal length and an absolute distance with respect to encoder positions.

In S1060, the outputs from the angular velocity sensor 130 and the accelerometer 121 are read. In S1070, based on the output value from the angular velocity sensor obtained in S1310, the axial rotation angular velocity calculation unit 301 calculates the axial rotation angular velocity $\theta'_{caxy}$. The axial rotation angular velocity generally has a linear relationship with the output value from the angular velocity sensor, and can therefore be obtained by multiplying the output value by a coefficient.

In S1410, it is determined whether or not the release switch 191 has the full depression being turned on, that is, the full depression is operated on the release button (not shown). If a result of the determination is YES, that is, if the camera is being subjected to exposure (with an instruction for the exposure being given), the procedure advances to S1420. If the result of the determination is NO, that is, if the camera has not been subjected to the exposure (with the instruction for the exposure not being given), the procedure advances to S1090. In S1090, the accelerometer output correction unit 302 substantially obtains a value only of the third term: $jr_{axy}\theta_{axy}$ by eliminating the fourth to seventh terms in Equation 27 based on the output value $A_{ccy2(O-X2Y2)}$ from the accelerometer obtained in S1080 and the axial rotation angular velocity $\theta'_{caxy}$ obtained in S1070. Note that the apostrophe (') represents the first-order differentiation, and the dieresis () represents the second-order differentiation.

In S1100, the revolution angular velocity calculation unit 304 obtains the revolution angular acceleration $\theta_{axy}$ by dividing the output value $jr_{axy}\theta_{axy}$ obtained in S1090 by the subject-side focal length $r_{axy}$. In addition, the revolution angular velocity $\theta'_{axy}$ necessary for the control is obtained by performing the time integration on the revolution angular acceleration. In the subsequent S1104, a ratio of the revolution angular velocity to the axial rotation angular velocity obtained in S1070 is calculated. In the subsequent S1106, a value of the ratio between the axial rotation angular velocity and the revolution angular velocity, which is calculated in S1104, is stored. If a previous value is remaining, the value is stored after overwriting the previous value, and then, the procedure advances to S1110.

In S1420, the value of the ratio between the axial rotation angular velocity and the revolution angular velocity, which was stored in S1106 in the past, is read, and the procedure advances to S1110. In S1110, it is determined whether or not a ratio between the axial rotation angular velocity $\theta'_{caxy}$ obtained in S1070 and the revolution angular velocity $\theta'_{axy}$ obtained in S1100 is larger than 0.1 (larger than a predetermined value). If the ratio is larger than 0.1, the procedure advances to S1120. If the ratio is equal to or smaller than 0.1 (equal to or smaller than a predetermined value), the procedure advances to S1130.

In S1120, correction calculation of the shake from the difference between the axial rotation and the revolution is performed to calculate the image shake velocity in the $Y_2$ direction on the image pickup surface by substituting the read information into $\uparrow V_{dcxy(O2-X2Y2)} \approx -(1+\beta)f(\theta'_{caxy}-\theta'_{axy})e^{j(\pi/2)}$ of Equation 15. The read information includes the image magnification value R, the real focal length value f, the axial rotation angular velocity value $\theta'_{caxy}$ calculated in real time, and the estimated revolution angular velocity $\theta'_{axy}$ obtained by multiplying the ratio between the axial rotation angular velocity and the revolution angular velocity, which is stored in S1106, by the axial rotation angular velocity value $\theta'_{caxy}$ calculated in real time. The image shake velocity thus obtained is set as a correction target velocity. The image shake velocity in the $Z_2$ direction on the image pickup surface can be similarly obtained from Equation 16, but description thereof is omitted here.

In S1130, correction calculation of the axial rotation shake is performed by substituting the revolution angular velocity $\theta'_{axy}$ in Equation 15 with a constant of zero instead of the output value from the sensor. This makes Equation 15 simple, resulting in $\uparrow V_{dcxy(O2-X2Y2)} \approx -(1+\beta)f\theta'_{caxy}e^{j(\pi/2)}$. The real-time image shake velocity in the $Y_2$ direction can be obtained by substituting the real-time axial rotation angular velocity $\theta'_{caxy}$ obtained in S1070 into Equation 15.

In S1140, a follow-up control value for driving the correction lens 101 is calculated from the image shake velocity obtained by one of the correction calculation of the shake from the difference between the axial rotation and the revolution (S1120) and the correction calculation of the axial rotation shake (S1130) in consideration of the sensitivity of the correction lens 101. In this case, the output of the current position of the correction lens 101 is monitored at the same time.

In S1150, a calculation result of the follow-up control performed in S1140 is output to the voltage driver 161 for driving the correction lens 101 based thereon. After the calculation result is output to the voltage driver 161, the procedure returns to S1020.

In S1300, it is determined whether or not the image magnification value R is equal to or larger than 0.15. If the image magnification value R is equal to or larger than 0.15, the procedure advances to S1320. If the image magnification value R is smaller than 0.15 in S1300, the procedure advances to S1410.

In S1320, unnecessary terms (that is, the second and fifth to seventh terms) of Equation 26 are eliminated based on the output value $A_{ccx2(O-X2Y2)}$ from the angular velocity sensor in the $X_2$ axis (optical axis) direction, which is obtained in S1310, and the axial rotation angular velocity $\theta'_{caxy}$, which is obtained in S1070, and the first term $r_{axy}$ being the acceleration in the optical axis direction is calculated. A focus shake velocity $r'_{axy}$ is obtained by subjecting the first term to the time integration.

A follow-up control value for driving the AF lens 140 is calculated from the focus shake velocity $r'_{axy}$ obtained in S1320. In S1340, a calculation result of the follow-up control performed in S1330 is output to the AF lens voltage driver 172 for driving the AF lens 140 based thereon. After that, the procedure returns to S1020.

—Detailed Description of Axial-Rotation-and-Revolution Model Diagram and Axial-Rotation-and-Revolution Shake Equation—

With reference to FIGS. 4A to 4D, an axial-rotation-and-revolution model diagram and the axial-rotation-and-revolution shake equation are described. First, the coordinate system of the image shake correction apparatus is described.

First, a moving coordinate system $O_2$-$X_2Y_2Z_2$ fixed onto the camera is described. The coordinate system $O_2$-$X_2Y_2Z_2$ is referred to as "moving coordinate system" because of making a shake movement integrally with the camera at the occurrence of a camera shake.

Figure 4A:
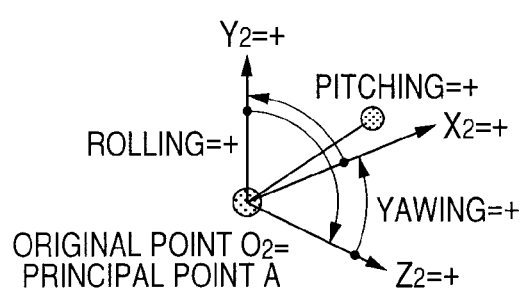
FIG. 4A is a diagram illustrating a coordinate system fixed on the camera and FIGS. 4B, 4C and 4D are three views of the camera.

A three-dimensional coordinate system is described with reference to a three-dimensional coordinate system diagram of FIG. 4A. As illustrated in FIG. 4A, the coordinate system, which is an orthogonal coordinate system, has the $X_2$ axis, the $Y_2$ axis, and the $Z_2$ axis being orthogonal to one another. The rotation about the original point $O_2$ around the $Z_2$ axis from a $+X_2$ axis to a $+Y_2$ axis is set as the pitching with a plus (+) sign. The rotation about the original point $O_2$ around the $Y_2$ axis from a $+Z_2$ axis to the $+X_2$ axis is set as the yawing with a plus (+) sign. The rotation about the original point $O_2$ around the $X_2$ axis from the $+Y_2$ axis to the $+Z_2$ axis is set as the rolling with a plus (+) sign.

Figure 4B:
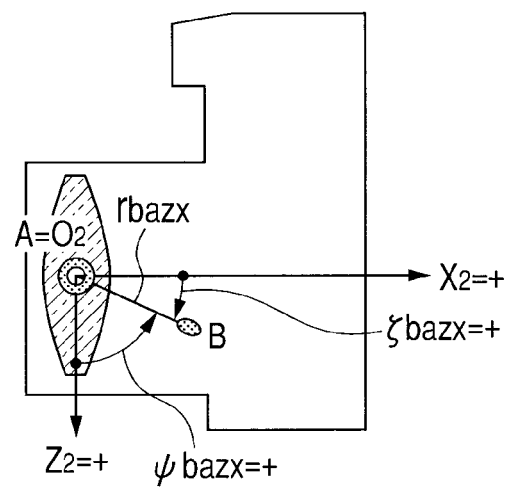
Figure 4C:
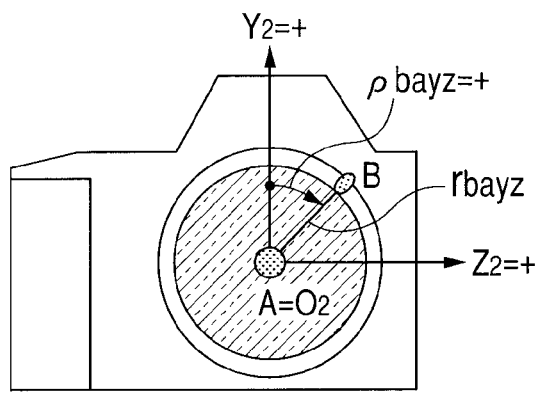
Figure 4D:
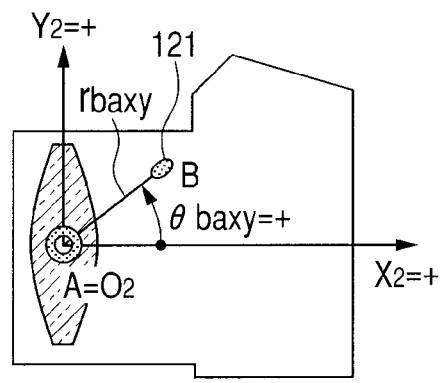

FIG. 4D is a camera side view for simplifying the sectional view of the camera illustrated in FIG. 1, in which a perspective view of the lens is illustrated. With reference to the camera side view of FIG. 4D, the coordinate system $O_2$-$X_2Y_2Z_2$ fixed onto the camera is described.

The original point $O_2$ of the coordinate system is fixed at the principal point A of the optical system, and the direction in the optical axis toward the image pickup element is represented by the $+X_2$ axis. The direction toward above the camera (upward direction in FIG. 4D) is represented by the $+Y_2$ axis, and the remaining direction is represented by the $+Z_2$ axis. In a state in which the camera is projected onto an $X_2Y_2$ plane, the position B of the accelerometer 121 is expressed by a length of a line segment $r_{baxy}$ between the original point $O_2$ and the position B of the accelerometer 121 and an angle $\theta_{baxy}$ formed between the $X_2$ axis and the line segment $r_{baxy}$. The angle $\theta_{baxy}$ is set as positive in terms of a direction of the rotation about the original point $O_2$ from the $+X_2$ axis to the $+Y_2$ axis.

The camera top view of FIG. 4B illustrates the position B of the accelerometer 121 in a state of being projected onto a $Z_2X_2$ plane. In a state in which the camera is projected onto the $Z_2X_2$ plane, the position B of the accelerometer 121 is expressed by a length of a line segment $r_{bazx}$ between the original point $O_2$ and the position B of the accelerometer 121 and an angle $\psi_{bazx}$ formed between the $Z_2$ axis and the line segment $r_{bazx}$. Note that the angle $\psi_{bazx}$ is set as positive in terms of a direction of the rotation from the $+Z_2$ axis to the $+X_2$ axis. Further, the position B is also expressed by an angle $\zeta_{bazx}$ formed between the $X_2$ axis and the line segment $r_{bazx}$. Note that the angle $\zeta_{bazx}$ is set as positive in terms of a direction of the rotation from the $+X_2$ axis to the $+Z_2$ axis.

The camera top view of FIG. 4C illustrates the position of the accelerometer 121 in a state of being projected onto a $Y_2Z_2$ plane. In a state in which the camera is projected onto the $Y_2Z_2$ plane, the position B of the accelerometer 121 is expressed by a length of a line segment $r_{bayz}$ between the original point $O_2$ and the position B of the accelerometer 121 and an angle $\rho_{bayz}$ formed between the $Y_2$ axis and the line segment $r_{bayz}$. Note that the angle $\rho_{bayz}$ is set as positive in terms of a direction of the rotation from the $+Y_2$ axis to the $+Z_2$ axis.

Figure 5:
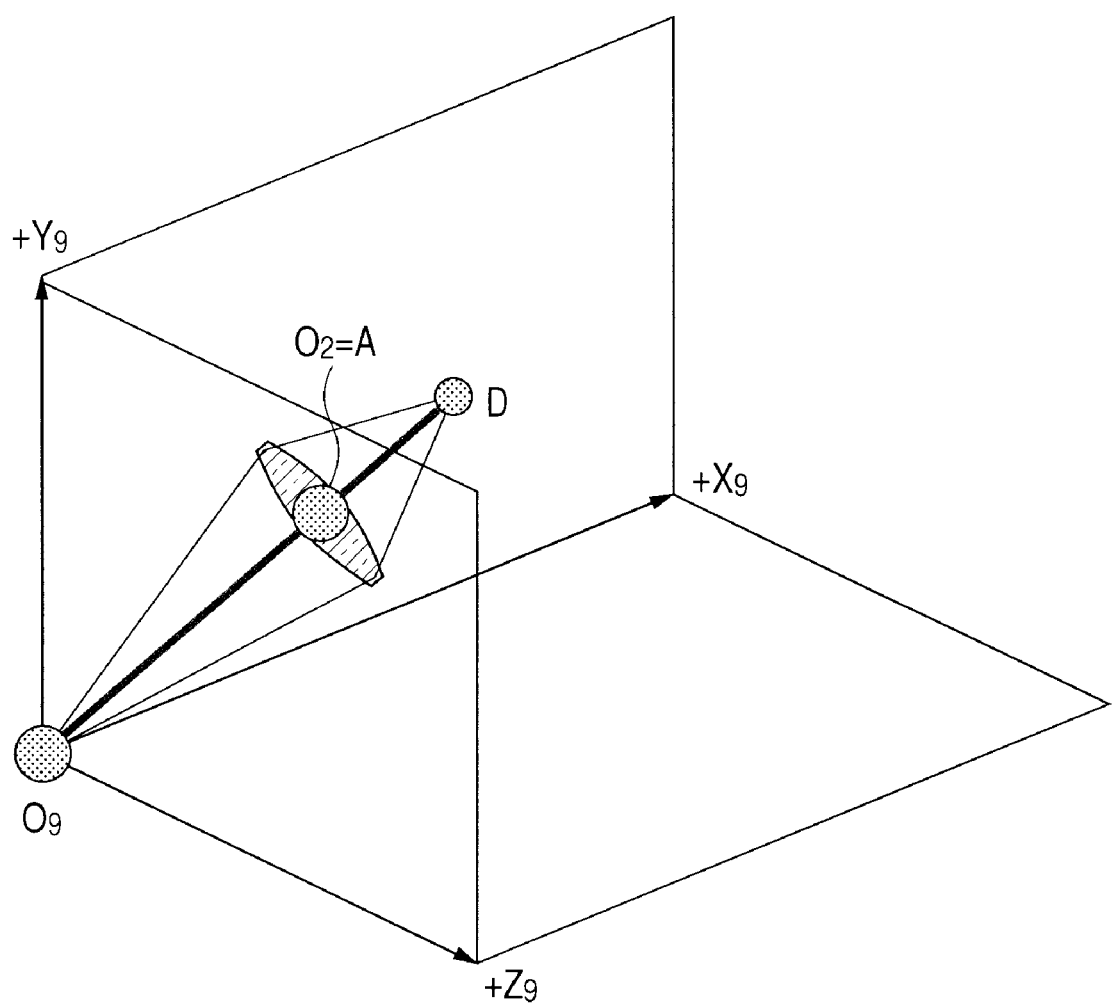
FIG. 5 is a diagram expressing only an optical system of the camera in a three-dimensional space.

Next, a fixed coordinate system $O_9$-$X_9Y_9Z_9$ in which a subject S exists is described. The coordinate system $O_9$-$X_9Y_9Z_9$ is referred to as "fixed coordinate system" because of being integral with the subject. FIG. 5 is a diagram expressing only the optical system of the camera in a three-dimensional space. A point A=$O_2$ is the principal point A of the camera lens, which has already been described, and is also the original point $O_4$ of a coordinate system $O_4$-$X_4Y_4Z_4$.

A layout of the fixed coordinate system $O_9$-$X_9Y_9Z_9$ in an initial state (time t=0) is described. A coordinate original point $O_g$ is caused to coincide with a subject to be photographed. A coordinate axis $+Y_9$ is set as a direction opposite to the gravity acceleration direction of the earth. The remaining coordinate axes $+X_9$ and $+Z_9$ are arbitrarily located. A point D represents an imaging point of the subject S, and geometrically-optically exists in a line that is an extension of a line segment OA.

Figure 6A:
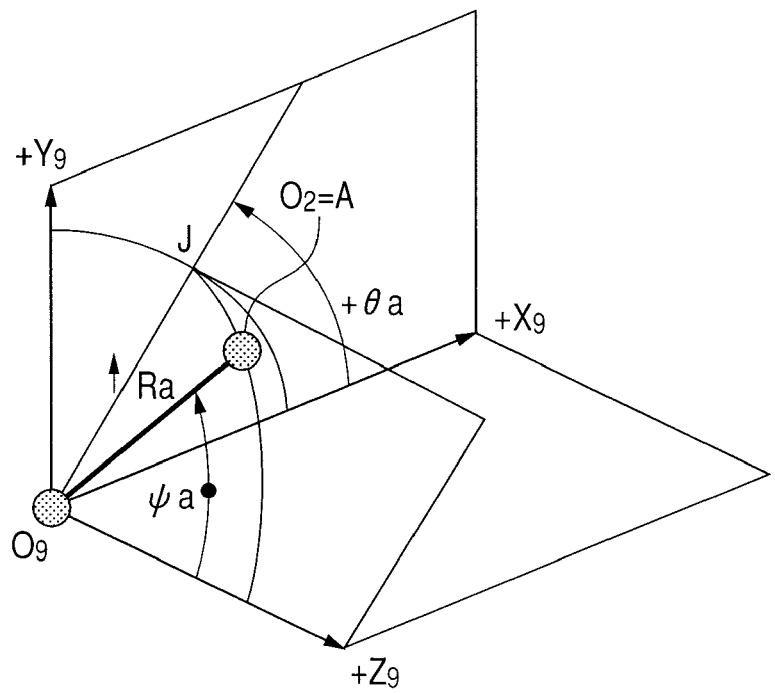
FIGS. 6A and 6B are diagrams illustrating a polar coordinate system and an orthogonal coordinate system of a principal point A.

With reference to FIG. 6A, a method for three-dimensional expression of the principal point A in the fixed coordinate system $O_9$-$X_9Y_9Z_9$ is described. In order to indicate the position of the camera in the space, FIG. 6A illustrates only the principal point A serving as a reference thereof, and an illustration of the other parts including the imaging point D is omitted. The principal point A is represented by a vector with respect to the original point $O_9$, which is set as a vector $\uparrow R_a$. The length of the vector $\uparrow R_a$ is set as a scalar $r_a$. An angle formed by a rotation about $O_9$ from a $Z_9$ axis to the vector $\uparrow R_a$ is set as $\psi_a$. An angle formed by a rotation from an $X_9$ axis to a straight line OJ is set as $\theta_a$. The straight line OJ is obtained by the XY plane being cut by a plane including the vector $\uparrow R_a$ and the $Z_9$ axis.

As described above, the vector $\uparrow R$, is expressed in the polar coordinate system by the three values of the scalar $r_a$ and the angles $\psi_a$ and $\theta_a$. If the three values can be calculated from the measurement by the sensor or the like, the position of the principal point A of the camera may be obtained.

(Reference: Orthogonal Coordinate System Conversion Equation)

Figure 6B:
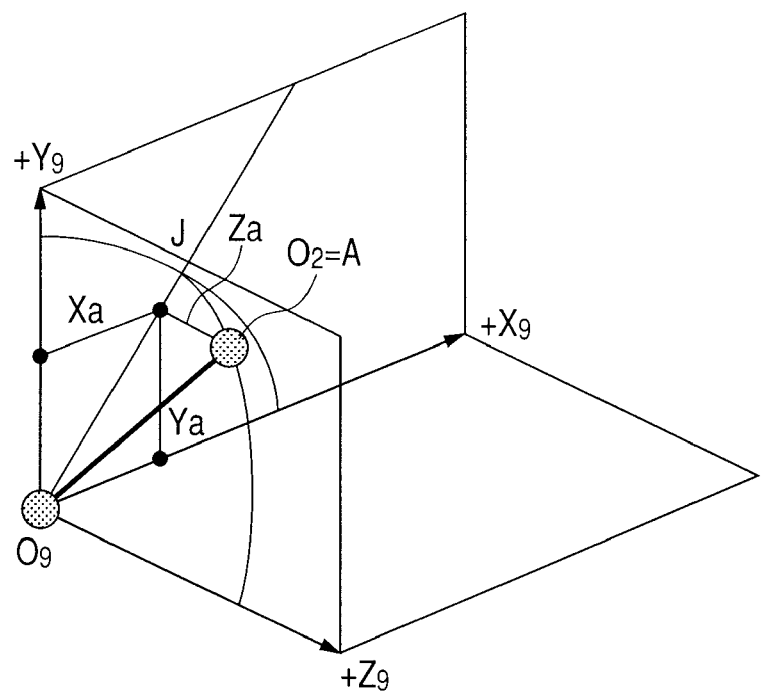

In this case, equations for converting the position of the principal point A from the polar coordinate system into the orthogonal coordinate system are as follows. FIG. 6B is a representation thereof by the orthogonal coordinate system.

$$X_a = r_a \sin \psi_a \times \cos \theta_a$$

$$Y_a = r_a \sin \psi_a \times \sin \theta_a$$

$$Z_a = r_a \cos \psi_a$$

(Description of Projected Coordinate System)

Figure 7:
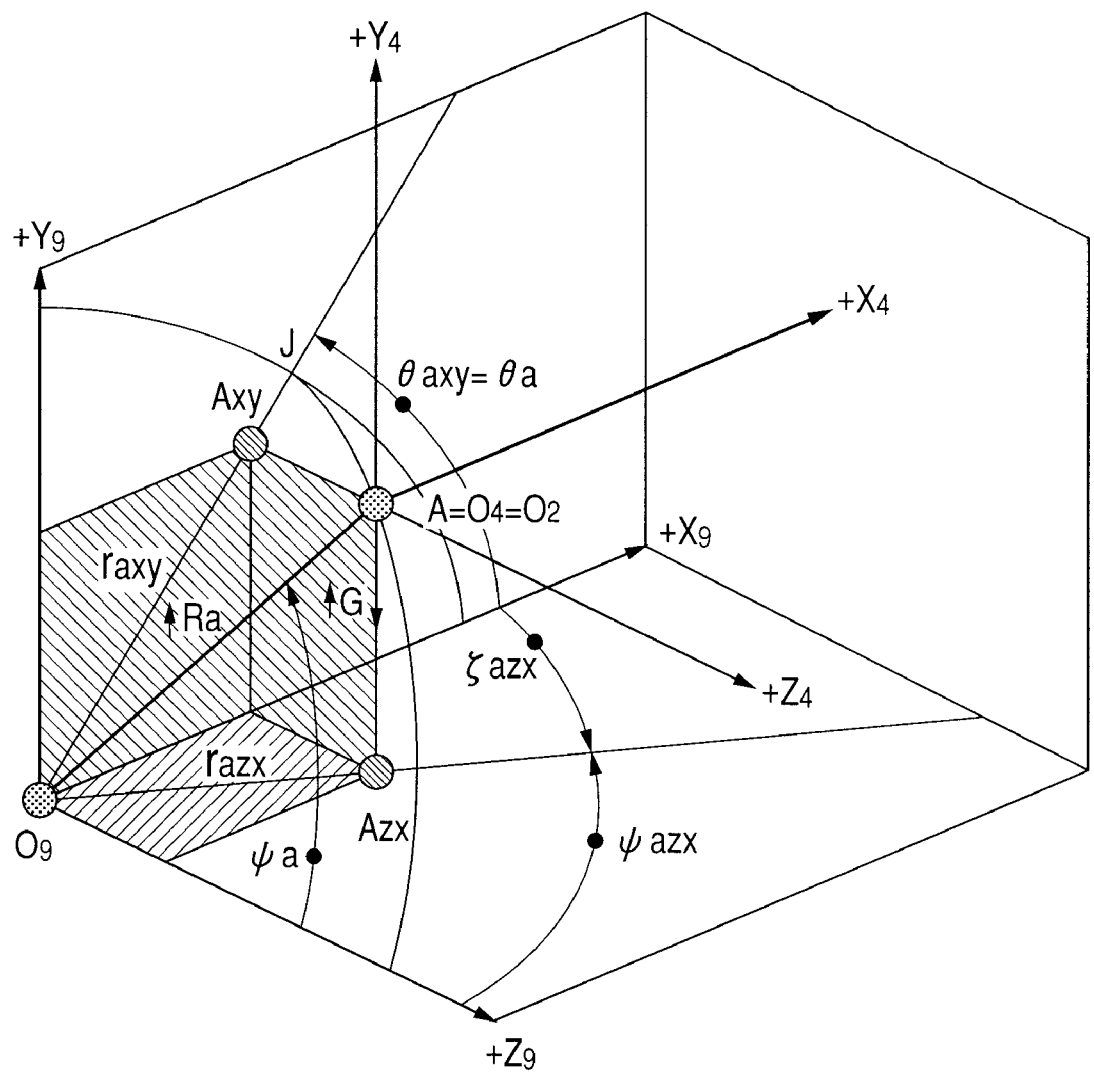
FIG. 7 is a diagram expressing coordinates of the principal point A projected onto an $X_9Y_9$ plane and a $Z_9X_9$ plane.

Next, with reference to FIG. 7, a coordinate expression for a case where the vector $\uparrow R$, is projected onto an $X_9Y_9$ plane and a coordinate expression for a case where the vector $\uparrow R$, is projected onto a $Z_9X_9$ plane are described.

FIG. 7 is referenced to describe a moving coordinate system $O_4$-$X_4Y_4Z_4$. At the principal point A, the moving coordinate system $O_4$-$X_4Y_4Z_4$ is also laid out, in which the original point $O_4$ is fixed at the principal point A. In other words, the original point $O_4$ is caused to move according to the movement of the principal point A. A coordinate axis $+X_4$ is constantly located in parallel with a coordinate axis $+X_9$, and a coordinate axis $+Y_4$ is constantly located in parallel with the coordinate axis $+Y_9$. The parallel property is maintained even when the principal point A moves. A direction of a gravity acceleration vector $\uparrow G$ from the principal point A is a negative direction of a coordinate axis $Y_9$.

With reference to FIG. 7, a two-dimensional coordinate expression for a case where the moving coordinate system $O_4$-$X_4Y_4Z_4$ is projected onto the $X_9Y_9$ plane is described. In FIG. 7, a point obtained by projecting the principal point A onto the $X_9Y_9$ plane is set as the principal point $A_{xy}$. A line segment between the original point $O_9$ and the principal point $A_{xy}$ is set as the scalar $r_{axy}$, and an angle formed by a rotation about the original point $O_9$ from the $X_9$ axis to the scalar $r_{axy}$ is set as $\theta_{axy}$. The angle $\theta_{axy}$ is the same as the angle $\theta_a$ described above. The symbol xy is appended to make it clear that the principal point A is projected onto the $X_9Y_9$ plane.

Figure 8:
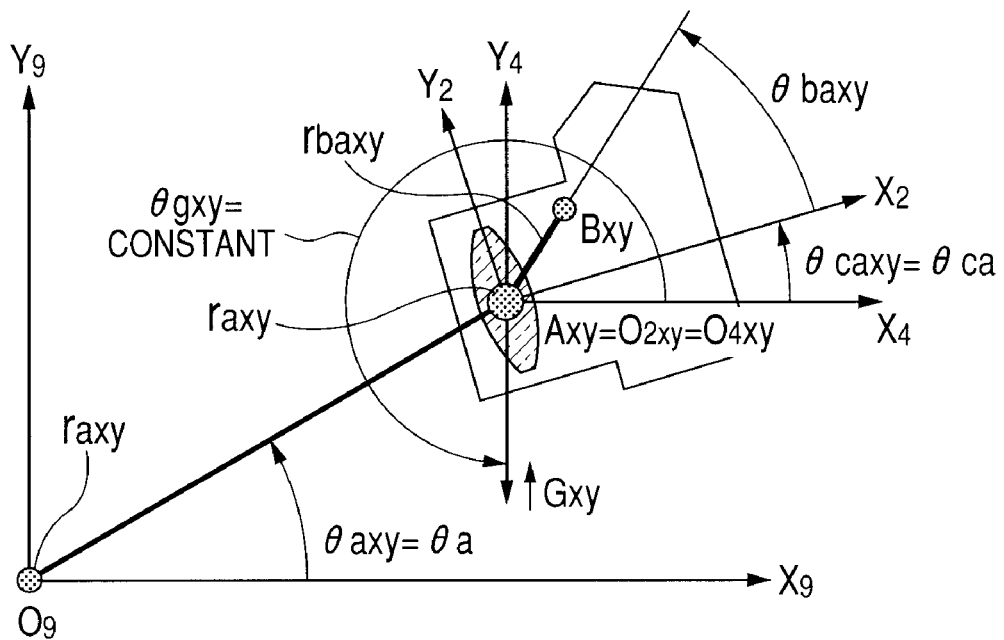
FIG. 8 is a diagram illustrating a state in which the camera is projected onto the $X_9Y_9$ plane.

FIG. 8 illustrates a state in which the camera is projected onto the $X_9Y_9$ plane. FIG. 8 illustrates the contour of the camera and the lens as well. The original point $O_4$ of the coordinate system $O_4$-$X_4Y_4$ is fixed at the principal point $A_{xy}$ described above. Even when the principal point $A_{xy}$ moves, the $X_4$ axis and the $Y_4$ axis are kept parallel with the $X_9$ axis and a $Y_9$ axis, respectively.

As described above, the original point $O_2$ of the coordinate system $O_2$-$X_2Y_2$ is fixed at the principal point $A_{xy}$ and moves integrally with the camera. In this case, the $X_2$ axis is caused to coincide with the optical axis of the camera at all times. The angle formed by the rotation about the original point $O_2$ from the $X_4$ axis to the $X_2$ axis is set as an axial rotation angle $\theta_{caxy}$ (=$\theta_{ca}$: completely the same value). The gravity acceleration vector ↑$G_{xy}$ at the principal point $A_{xy}$ indicates the positive rotation (counterclockwise) about the principal point $A_{xy}$ from the $X_4$ axis, and the angle formed by a rotation from the $X_4$ axis to the vector ↑$G_{xy}$ is set as $\theta_{gxy}$. The value $\theta_{gxy}$ is constant.

Here, the terminology used in the present invention is described. In the present invention, in comparison to the movements of the sun and the earth, the original point $O_9$ at which the subject exists is assumed to be the sun, and the principal point A of the camera is assumed to be the center of the earth. On such an assumption, the angle $\theta_{axy}$ is called an "revolution angle" in the XY plane, and the angle $\theta_{caxy}$ is called an "axial rotation angle" in the XY plane. In other words, there is a similarity in that the revolution refers to the earth (camera) revolving about the sun (subject), while the axial rotation refers to the earth (camera) rotating by itself.

Figure 9:
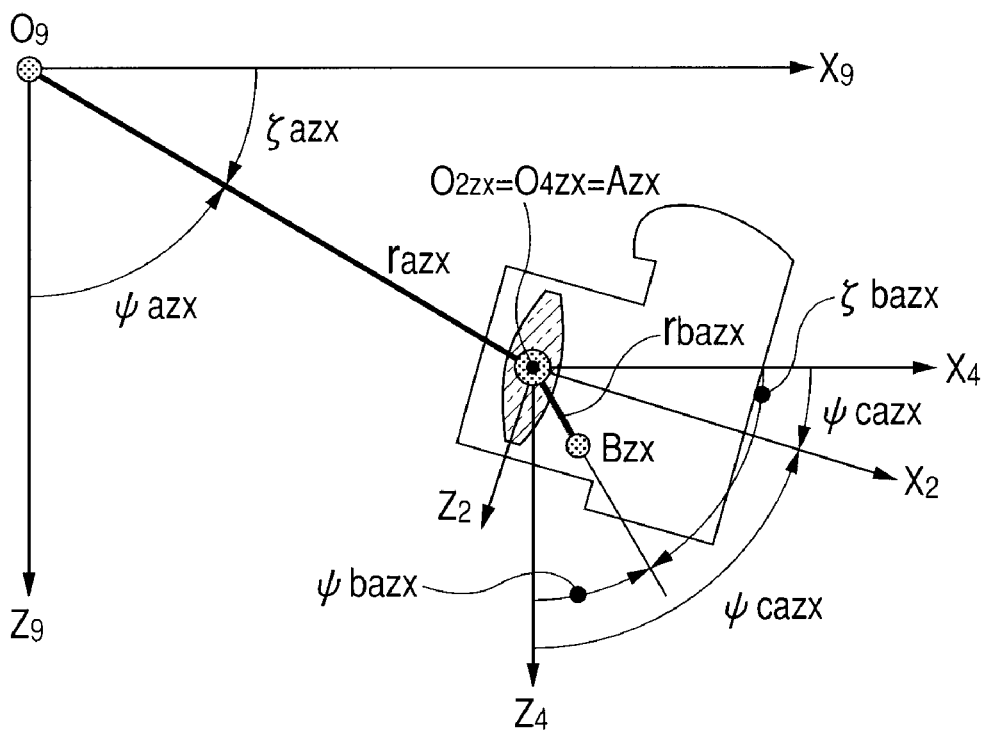
FIG. 9 is a diagram illustrating a state in which the camera is projected onto the $Z_9X_9$ plane.

Next, with reference to FIG. 9, a two-dimensional coordinate expression for a case where the camera is projected onto the $Z_9X_9$ plane is described. FIG. 9 illustrates a state in which the camera is projected onto the $Z_9X_9$ plane. FIG. 9 illustrates the contour of the camera and the lens as well. The original point $O_4$ of the coordinate system $O_4$-$X_4Y_4$ is fixed at the principal point $A_{zx}$. Even when the principal point $A_{zx}$ moves, the $Z_4$ axis and the $X_4$ axis are kept parallel with the $Z_9$ axis and a $X_9$ axis, respectively.

The original point $O_2$ of a coordinate system $O_2$-$Z_2X_2$ is fixed at a principal point $A_{zx}$, and is caused to move integrally with the camera. In this case, the $X_2$ axis is caused to coincide with the optical axis of the camera at all times. The angle formed by the rotation about the original point $O_2$ from the $Z_4$ axis to the $X_2$ axis is set as $\psi_{cazx}$. In addition, the angle formed by the rotation about the original point $O_2$ from the $X_4$ axis to the $X_2$ axis is set as $\zeta_{cazx}$.

Figure 10:
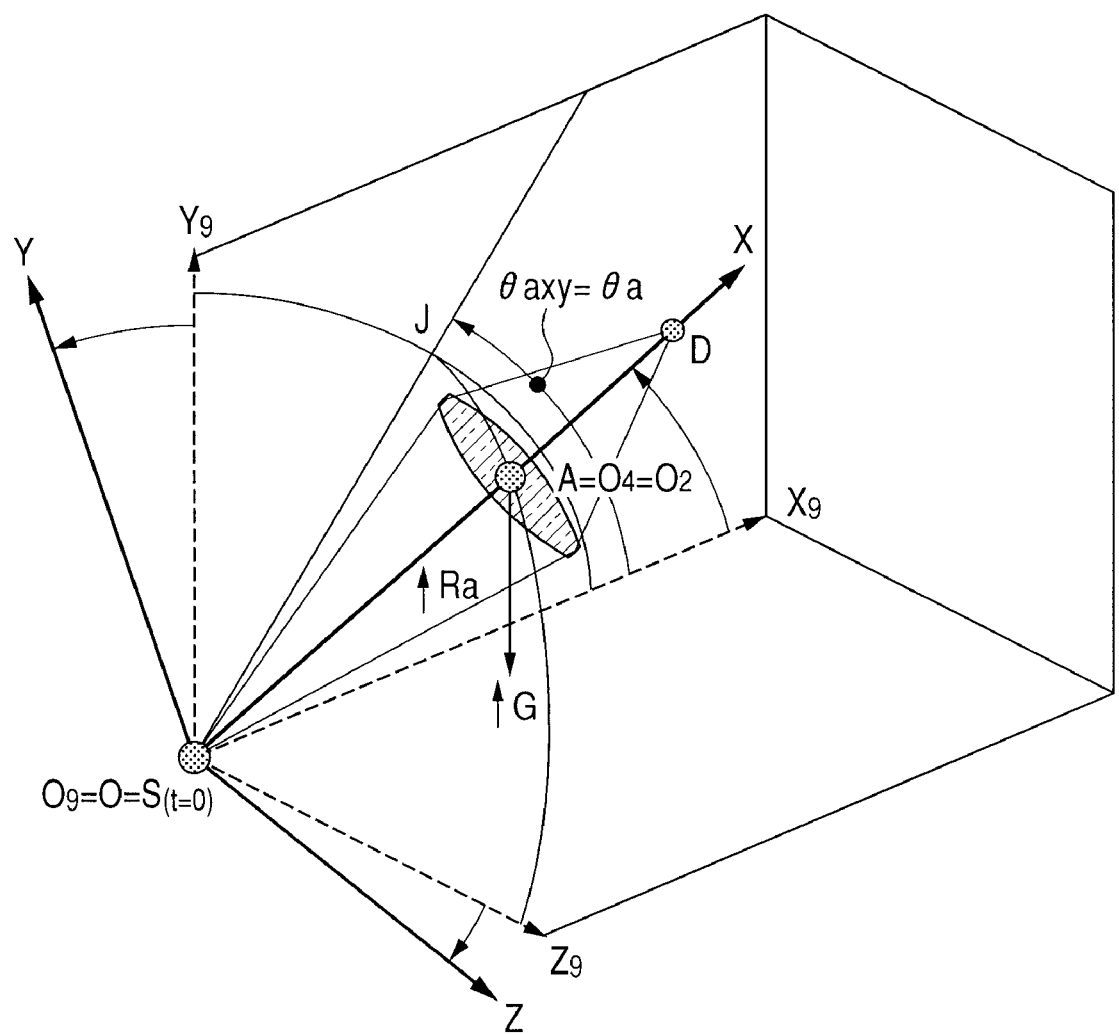
FIG. 10 is a diagram illustrating an initial state of the camera at an initial time t=0.

With reference to the three-dimensional coordinate system illustrated in FIG. 10, an initial state of the camera at the initial time t=0 is described. Here, for the sake of convenience, the description in terms of the fixed coordinate system $O_9$-$X_9Y_9Z_9$ is made by assuming that the subject S (t=0) to be photographed is caused by a photographer to coincide with a center of a finder or a liquid crystal display (LCD) and that the subject S (t=0) exists on the optical axis. The original point $O_9$ is caused to coincide with the subject S (t=0). The principal point A of the lens and the imaging point D at which the subject S (t=0) is imaged geometrically-optically exist on the optical axis in a straight line. The gravity acceleration vector ↑G from the position of the principal point A is the negative direction of the coordinate axis $Y_9$.

If the photographer sets the subject S to be photographed within an autofocus (AF) frame but not at the center of the finder or the liquid crystal display (LCD), a line segment connecting the subject S and the principal point A may be set as the vector ↑$R_a$ to thereby perform the modeling.

Subsequently set is a new fixed coordinate system O-XYZ. The original point O of the fixed coordinate system O-XYZ is caused to coincide with the original point $O_9$, and a coordinate axis X is caused to coincide with the optical axis of the camera. A direction of a coordinate axis Y is set so that a coordinate axis $Y_9$ exists in the XY plane. If the coordinate axis X and the coordinate axis Y are defined, a coordinate axis Z is uniquely defined.

Figure 11:
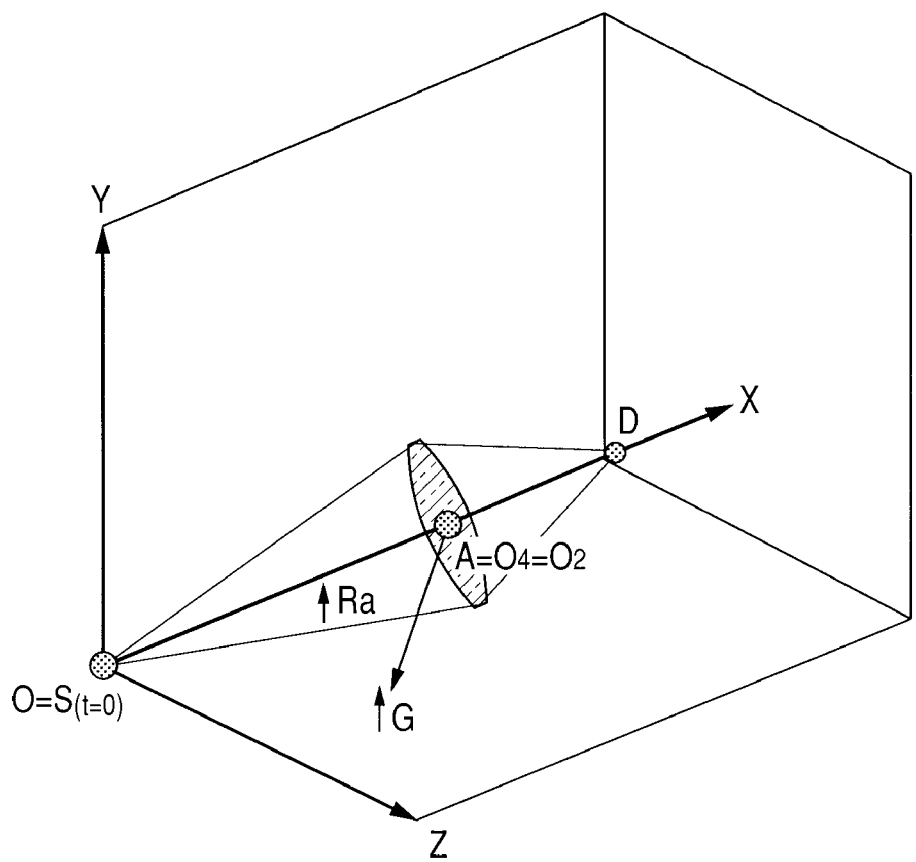
FIG. 11 is a diagram illustrating the initial state of the camera in an O-XYZ coordinate system.

As illustrated in FIG. 11, hereinafter, for the sake of convenience, only the fixed coordinate system O-XYZ is illustrated in the fixed coordinate system by omitting an illustration of the fixed coordinate system $O_9$-$X_9Y_9Z_9$. According to the definitions of the coordinate systems described above, in the initial state at the time t=0, the gravity acceleration vector ↑G exists in the XY plane.

Figure 12:
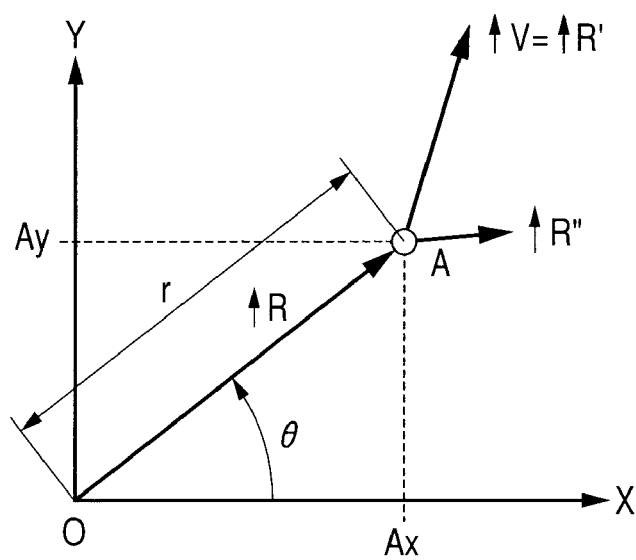
FIG. 12 is a basic explanatory diagram of the polar coordinate system.

Subsequently, a shake equation is derived. The shake equation indicates a relationship between a camera shake and an image shake. The polar coordinate system representation is used to express the equation with ease. Further, differentiation is performed to obtain the first-order differentiation and the second-order differentiation of the vector and the angle. With reference to FIG. 12, which is a basic explanatory diagram of the polar coordinate system, the meanings of the general symbols in the equations used here are described. The position of the point A existing in the coordinate system O-XY is expressed by a position vector ↑R. The position vector ↑R is a time function, which is also expressed as ↑R(t).

$$\text{The position vector: } {\uparrow}R(t) = r(t)e^{j\theta(t)} \qquad <\text{Equation 01}>$$
$$= {\uparrow}R$$
$$= re^{j\theta}$$
$$= r\cos\theta + jr\sin\theta$$

The real number term $r\cos\theta$ represents an X direction component, and the imaginary number term $jr\sin\theta$ represents a Y direction component. If indicated by the orthogonal coordinate system, the X direction component is $A_x = r\cos\theta$, and the Y direction component is $A_y = r\sin\theta$.

Subsequently, a velocity vector ↑V=↑R' is obtained by differentiating the position vector ↑R with respect to the time t to obtain the first-order differentiation.

$$\text{The velocity vector: } {\uparrow}V(t) = {\uparrow}(R') \qquad <\text{Equation 02}>$$
$$= r'e^{j\theta} + r\theta'e^{j(\theta+\Pi/2)}$$

If indicated by the orthogonal coordinate system:
the X direction component is $V_x = A'_x = r'\cos\theta + r\theta'\cos(\theta+\pi/2)$; and
the Y direction component is $V_y = A'_y = r'\sin\theta + r\theta'\sin(\theta+\pi/2)$.

Subsequently, an acceleration vector ↑R is obtained by differentiating the velocity vector ↑R' with respect to the time t to obtain the first-order differentiation.
<Equation 03>
The acceleration vector:

$${\uparrow}R = r''e^{j\theta} + r\theta'^2 e^{j(\theta+\pi)} + r\theta'' e^{j(\theta+\pi/2)} + 2r'\theta' e^{j(\theta+\pi/2)}$$

where:
the first term: $r''e^{j\theta}$ is an acceleration component indicating a change in length r;
the second term: $r\theta'^2 e^{j(\theta+\pi)}$ is a centripetal force component;
the third term: $r\theta'' e^{j(\theta+\pi/2)}$ is an angular acceleration component; and
the fourth term: $2r'\theta' e^{j(\theta+\pi/2)}$ is a Coriolis force component.

An indication thereof by the orthogonal coordinate system is obtained by the following Equation 04.
<Equation 04>
An X direction component $A_x$:

$$A_x = r''\cos\theta + r\theta'^2\cos(\theta+\pi) + r\theta''\cos(\theta+\pi/2) + 2r'\theta'\cos(\theta+\pi/2)$$

A Y direction component $A_y$:

$$A_y = r''\sin\theta + r\theta'^2\sin(\theta+\pi) + r\theta''\sin(\theta+\pi/2) + 2r'\theta'\sin(\theta+\pi/2)$$

Figure 13:
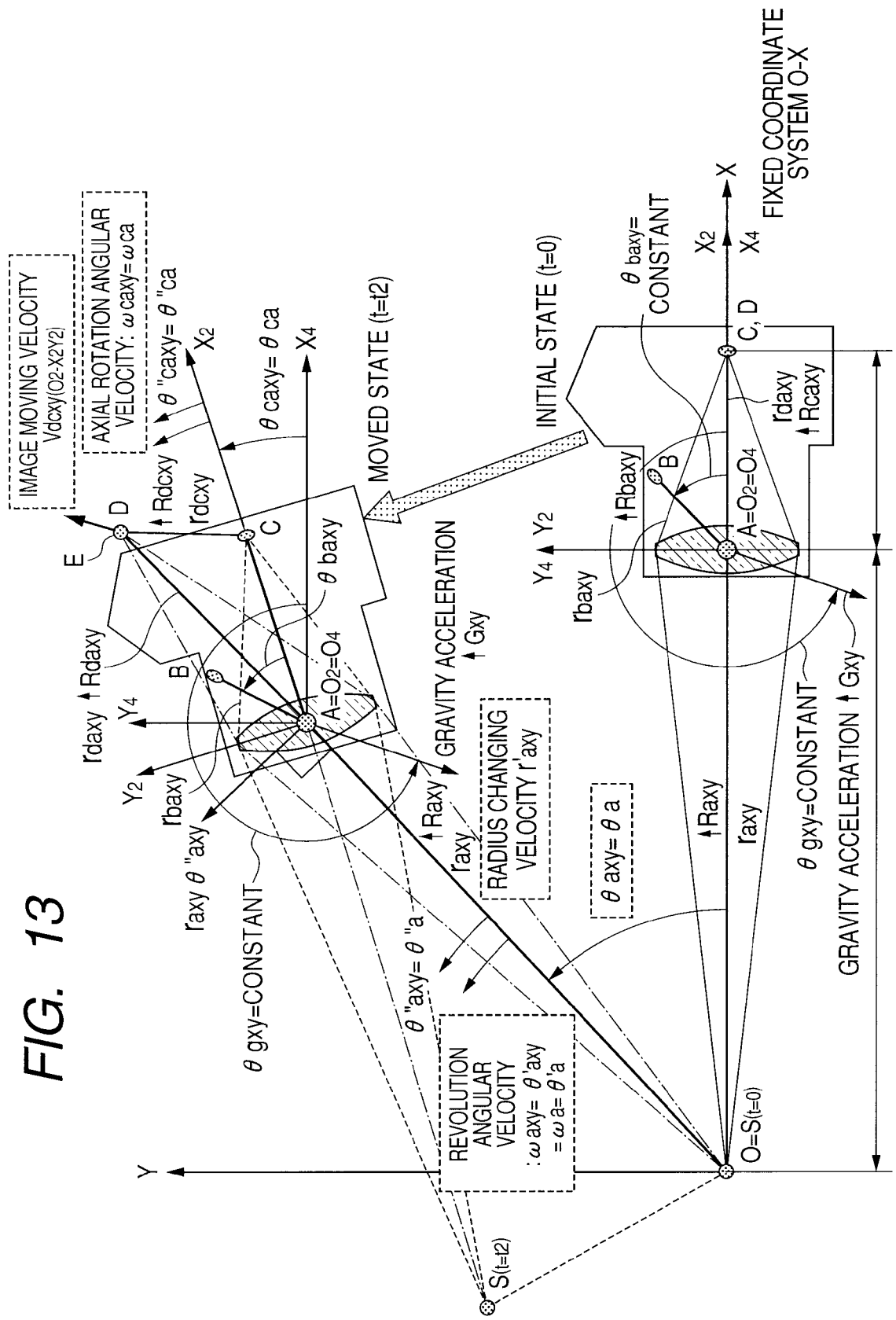
FIG. 13 is a diagram illustrating a state in which the camera is projected onto a two-dimensional XY coordinate system.

FIG. 13 is referenced to describe a theoretical equation according to the present invention in a two-dimensional XY coordinate system in which the camera is projected onto the XY plane. With reference to FIG. 13, settings of coordinate systems and symbols in the two-dimensional XY coordinate system are described. The description partially includes contents that have already been described.

The subject S is located in a fixed coordinate system O-XY. The symbols are described in an initial state diagram at the time (t=0). In the initial state (t=0), the optical axis of the camera coincides with the coordinate axis X of the fixed coordinate system O-XY. In the initial state (t=0), the subject S coincides with the original point O of the fixed coordinate system O-XY. In the fixed coordinate system O-XY, the principal point A is expressed by a vector $\uparrow R_{axy}$. A length of a line segment between the original point O and the principal point A of the camera is set as the scalar $r_{axy}$, and a point at which the original point O is imaged through the lens is set as the imaging point D. A point C is a center point of the image pickup element 203, and in the initial state (t=0), the imaging point D coincides with the point C.

The symbols are described in a moved state diagram at a given time (t=t2). The original point $O_4$ of the coordinate system $O_4$-$X_4Y_4$ is fixed at the principal point A. A coordinate axis $X_4$ and a coordinate axis $Y_4$ are kept parallel with the coordinate axis X and the coordinate axis Y, respectively, at all times. The original point $O_2$ of the coordinate system $O_2$-$X_2Y_2$ is fixed at the principal point A. A coordinate axis $X_2$ is kept in the optical axis direction of the camera at all times.

The accelerometer 121 is fixed at a point B inside the camera, and is expressed by a vector $\uparrow R_{baxy}$ in the coordinate system $O_2$-$X_2Y_2$. A length of a line segment AB is set as a scalar $r_{baxy}$, and an angle formed by a rotation about the original point $O_2$ from the coordinate axis $X_2$ to the line segment AB is set as $\theta_{baxy}$.

An image at the original point O is imaged by the lens in the position of the point D different from the point C that is the center of the image pickup element. The imaging point D with reference to the principal point A is expressed by a vector $\uparrow R_{daxy}$. The point D with reference to the point C is expressed by a vector $\uparrow R_{dcxy}$. A scalar $r_{dcxy}$ indicating a length from the point C to the point D corresponds to a length by which the imaging point D moved from the time t=0 until the time t2. At the given time t2, a relative moving velocity vector of the imaging point D with reference to the point C in the moving coordinate system $O_2$-$X_2Y_2$ is set as a vector $\uparrow V_{dcxy(O2\text{-}X2Y2)}$.

In the fixed coordinate system O-XY, an angle formed by a rotation about the original point O from the coordinate axis X to the vector $\uparrow R_{axy}$ is set as a revolution angle $\theta_{axy}$. In a moving coordinate system $O_4$-$X_4Y_4$, an angle formed by a rotation about the original point $O_4$ from the coordinate axis $X_4$ to the coordinate axis $X_2$ is set as an axial rotation angle $\theta_{caxy}$.

The first-order differentiation and the second-order differentiation of the vector $\uparrow R_{axy}$ with respect to the time t are represented as vectors $\uparrow R'_{axy}$ and vector $\uparrow R_{axy}$, respectively. By the same differentiation, a vector $\uparrow R_{caxy}$ results in $\uparrow R'_{caxy}$ and $\uparrow R_{caxy}$, the vector $\uparrow R_{daxy}$ results in $\uparrow R'_{daxy}$ and $\uparrow R_{daxy}$, the revolution angle $\theta_{axy}$ results in $\theta'_{axy}$ and $\theta_{axy}$, and the axial rotation angle $\theta_{caxy}$ results in $\theta'_{caxy}$ and $\theta_{caxy}$.

At the given time t2, the relative moving velocity vector $\uparrow V_{dcxy(O2\text{-}X2Y2)}$ of the imaging point D with reference to the point C in the moving coordinate system $O_2$-$X_2Y_2$ is obtained. A moving velocity vector $\uparrow V_{daxy(O\text{-}XY)}$ of the imaging point D in the fixed coordinate system O-XY is obtained by the following Equation 05.

$$\uparrow V_{daxy(O-XY)} = \uparrow R'_{daxy(O-XY)} \quad <\text{Equation 05}>$$
$$= r'_{daxy} e^{j\theta_{axy}} + r_{daxy}\theta'_{daxy} e^{j(\theta_{axy}+\Pi/2)}$$
$$= r'_{daxy} e^{j\theta_{axy}} +$$
$$r_{daxy}\theta'_{axy} e^{j(\theta_{axy}+\Pi/2)} \because \theta'_{daxy}$$
$$= \theta'_{axy}$$

A moving velocity vector $\uparrow V_{caxy(O\text{-}XY)}$ of a center C of the image pickup element in the fixed coordinate system O-XY is obtained by the following Equation 06.

$$\uparrow V_{caxy(O-XY)} = \uparrow R'_{caxy(O-XY)} \quad <\text{Equation 06}>$$
$$= r'_{caxy} e^{j\theta_{caxy}} + r_{caxy}\theta'_{caxy} e^{j(\theta_{caxy}+\Pi/2)}$$
$$= r_{caxy}\theta'_{caxy} e^{j(\theta_{caxy}+\Pi/2)} \because r'_{caxy}$$
$$= 0$$

Equation 07 is derived according to a geometrical-optical imaging equation.

$$1/f = 1/r_{axy} + 1/r_{daxy} \quad <\text{Equation 07}>$$

where f is the focal length in the optical system. Equation 07 is modified.

$$r_{daxy} = f r_{axy} / (r_{axy} - f)$$
$$= f r_{axy}(r_{axy} - f)^{-1} r'_{daxy}$$
$$= f r'_{axy}(r_{axy} - f)^{-1} - f r_{axy} r'_{axy}$$
$$(r_{axy} - f)^{-2}$$

From the above-mentioned Equation, a relative moving velocity vector $\uparrow V_{dcxy(O\text{-}XY)}$ of the imaging point D with respect to the point C in the fixed coordinate system O-XY is obtained by the following Equation 08.

$$\uparrow V_{dcxy} = \uparrow R'_{dcxy} \quad <\text{Equation 08}>$$
$$= \uparrow V_{dxy} - \uparrow V_{cxy}$$
$$= (\uparrow V_{daxy} + \uparrow V_{axy}) - (\uparrow V_{caxy} + \uparrow V_{axy})$$
$$= \uparrow V_{daxy} - \uparrow V_{caxy}$$
$$= r'_{daxy} e^{j\theta_{axy}} + r_{daxy}\theta'_{axy} e^{j(\theta_{axy}+\Pi/2)} - r_{caxy}$$
$$\theta'_{caxy} e^{j(\theta_{caxy}+\Pi/2)}$$
$$= [f r'_{axy}(r_{axy} - f)^{-1} - f r_{axy} r'_{axy}(r_{axy} - f)^{-2}]$$
$$e^{j\theta_{axy}} + f r_{axy}(r_{axy} - f)^{-1} \theta'_{axy} e^{j(\theta_{axy}+\Pi/2)} -$$
$$r_{caxy}\theta'_{caxy} e^{j(\theta_{caxy}+\Pi/2)}$$

A relationship between a scalar $r_{caxy}$ and the scalar $r_{axy}$ (t=0) is obtained according to the following Equation 09.

$$r_{caxy} = r_{daxy(t=0)} \quad <\text{Equation 09}>$$
$$= f \cdot r_{axy(t=0)} \cdot (r_{axy(t=0)} - f)^{-1}$$
$$= (1 + \beta) f$$

By substituting the above-mentioned Equation, a relative moving velocity vector $\uparrow V_{dcxy(O-XY)}$ in the fixed coordinate system O-XY is obtained by the following Equation 10.

$$\uparrow V_{dcxy(O-XY)} = [fr'_{axy}(r_{axy}-f)^{-1} - fr_{axy}r'_{axy}(r_{axy}-f)^{-2}] \quad <\text{Equation 10}>$$
$$e^{j\theta_{axy}} + fr_{axy}(r_{axy}-f)^{-1}\theta'_{axy}e^{j(\theta_{axy}+\Pi/2)} -$$
$$(1+\beta)f \cdot \theta'_{caxy}e^{j(\theta_{caxy}+\Pi/2)}$$

Subsequently, coordinate conversion is performed from the fixed coordinate system O-XY into the moving coordinate system $O_2$-$X_2Y_2$ fixed onto the camera. To that end, a vector $\uparrow V_{dcxy(O-XY)}$ may be caused to rotate by an axial rotation angle $(-\theta_{caxy})$. Therefore, the image shake velocity vector $\uparrow V_{dcxy(O2-X2Y2)}$ in the moving coordinate system $O_2$-$X_2Y_2$ fixed onto the camera is obtained by the following Equation 11.

$$\uparrow V_{dcxy(O2-X2Y2)} = V_{dcxy(O-XY)}e^{j(-\theta_{caxy})} \quad <\text{Equation 11}>$$
$$= [fr'_{axy}(r_{axy}-f)^{-1} - fr_{axy}r'_{axy}(r_{axy}-f)^{-2}]$$
$$e^{j(\theta_{axy}-\theta_{caxy})} + fr_{axy}(r_{axy}-f)^{-1}$$
$$\theta'_{axy}e^{j(\theta_{axy}+\Pi/2-\theta_{caxy})} -$$
$$(1+\beta)f \cdot \theta'_{caxy}e^{j(\theta_{caxy}+\Pi/2-\theta_{caxy})}$$

Further organization thereof leads to Equation 12 described above.

$$\uparrow V_{dcxy(O2-X2Y2)} = [fr'_{axy}(r_{axy}-f)^{-1} - \quad <\text{Equation 12}>$$
$$fr_{axy}r'_{axy}(r_{axy}-f)^{-2}]e^{j(\theta_{axy}-\theta_{caxy})} +$$
$$fr'_{axy}(r_{axy}-f)^{-1}\theta'_{axy}e^{j(\theta_{axy}+\Pi/2-\theta_{caxy})} -$$
$$(1+\beta)f\theta'_{caxy}e^{j(\Pi/2)}$$

The image shake velocity vector $\uparrow V_{dcxy(O2-X2Y2)}$ in the moving coordinate system $O_2$-$X_2Y_2$ corresponds to the image shake velocity relative to the image pickup surface of the camera, and is the exact equation for exactly expressing the image shake movement to be actually recorded as an image. In the exact equation, an imaginary number part thereof, that is, the component in a coordinate axis $Y_2$ direction is an image shake component in an up-and-down direction of the camera on the image pickup surface. Further, a real number part of Equation 12, that is, the component in a coordinate axis $X_2$ direction is the image shake component in the optical axis direction of the camera, and is a component that leads to a so-called out-of-focus picture.

A shake of the camera supported by the hand of the photographer is considered to be a vibration movement having a minute amplitude about one given point in a space. Hence, the exactly-obtained image shake velocity vector $\uparrow V_{dcxy(O2-X2Y2)}$ in the moving coordinate system $O_2$-$X_2Y_2$ is converted into the approximation equation under the following conditions.

On the assumption that the state at the given time t2 exhibits vibrations in the vicinity of the initial state at the time t=0, the following Equation 13 is obtained.

$$r_{axy} \approx (1+\beta)f/\beta \quad <\text{Equation 13}>$$

Modification thereof leads to:

$$r_{axy} - f \approx f/\beta$$
$$\approx f \cdot r_{axy}/(r_{axy}-f)$$
$$= f \cdot (1+\beta)(f/\beta)/(f/\beta)$$
$$= f \cdot (1+\beta).$$

By substituting the resultant, $r'_{axy} \approx 0$, and $\theta_{axy}+\pi/2-\theta_{caxy} \approx \pi/2$ into $V_{dcxy(O2-X2Y2)}$ the following Equation 14 is derived.

$$\uparrow V_{dcxy(O2-X2Y2)} = \quad <\text{Equation 14}>$$
$$V_{dcxy(O-XY)}e^{j(-\theta_{caxy})} \approx [f \cdot \text{zero}(r_{axy}-f)^{-1} -$$
$$fr_{axy} \cdot \text{zero}(r_{axy}-f)^{-2}]e^{j(\theta_{axy}-\theta_{caxy})} +$$
$$(1+\beta)f\theta'_{axy}e^{j(\Pi/2)} - (1+\beta)f\theta'_{caxy}e^{j(\Pi/2)} \approx$$
$$-(1+\beta)f(\theta'_{caxy}-\theta'_{axy})e^{j(\Pi/2)}$$

Therefore, an approximation theoretical equation for the image shake velocity vector $\uparrow V_{dcxy(O2-X2Y2)}$ in the moving coordinate system $O_2$-$X_2Y_2$ in the XY plane is obtained as Equation 15 described above.

$$\uparrow V_{dcxy(O2-X2Y2)} \approx -(1+\beta)f(\theta'_{caxy}-\theta'_{axy})e^{j(\pi/2)} \quad <\text{Equation 15}>$$

The component indicating a direction of an image shake vector on the right-hand side of Equation 15 is $e^{j(\pi/2)}$, and hence the direction of the image shake is the $Y_2$ axis direction which is a 90-degree direction with respect to the $X_2$ axis. $\theta'_{caxy}$ represents the axial rotation angular velocity about the principal point A, and $\theta'_{axy}$ represents the revolution angular velocity of the principal point A about the original point O of the fixed coordinate system. $\beta$ represents an image taking magnification of the optical system, and f represents the real focal length. $(1+\beta)f$ represents the image-side focal length. Therefore, the approximation equation means that the image shake velocity in the $Y_2$ direction on the image pickup surface is −(image-side focal length)×(value obtained by subtracting the revolution angular velocity from the axial rotation angular velocity).

Figure 14:
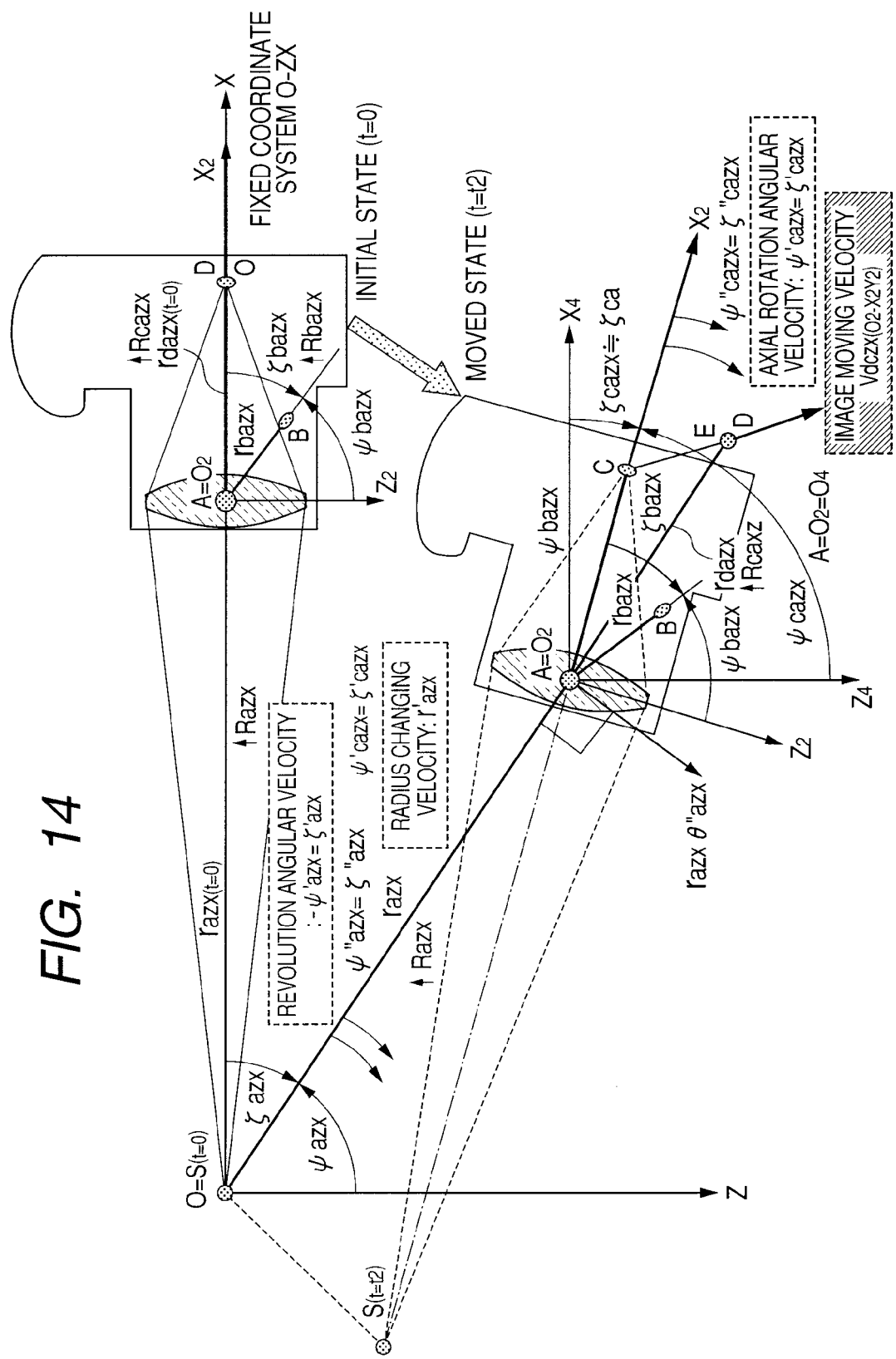
FIG. 14 is a diagram illustrating a state in which the camera is projected onto a two-dimensional ZX coordinate system.

FIG. 14 is referenced to describe a theoretical equation for an image shake according to the present invention in a two-dimensional ZX coordinate system in which the camera is projected onto the ZX plane. In a case where the hand-held shake is a minute vibration movement about the position at the initial state, approximation conditions are set as $\zeta_{azx} \approx \text{zero}$, $\zeta_{cazx} \approx \text{zero}$, $r_{azx} \approx \text{(constant value)}$, $r'_{azx} \approx \text{zero}$, and $r_{azx} \approx \text{zero}$. Under the approximation conditions, the approximation theoretical equation for an image shake velocity vector $\uparrow V_{dczx(O2-Z2X2)}$ in a moving coordinate system $O_2$-$Z_2X_2$ in a ZY plane is obtained as the following Equation 16 by the same procedure as the approximation equation $V_{dcxy(O2-X2Y2)}$ in the XY plane.

$$\uparrow V_{dczx(O2-Z2X2)} \approx -(1+\beta)f(\zeta'_{cazx}-\zeta'_{azx})e^{j(\pi/2)} \quad <\text{Equation 16}>$$

The component indicating a direction of an image shake vector on the right-hand side of Equation 16 is $ej^{(\pi/2)}$, and hence the direction of the image shake is the $Z_2$ axis direction which is a 90-degree direction with respect to the $X_2$ axis. $\zeta'_{cazx}$ represents the axial rotation angular velocity about the principal point A, and $\zeta'_{azx}$ represents the revolution angular velocity of the principal point A about the original point O of the fixed coordinate system. $\beta$ represents an image taking magnification of the optical system, and f represents the real focal length. $(1+\beta)f$ represents the image-side focal length.

Therefore, the approximation equation means that the image shake velocity in the $X_2$ direction on the image pickup element surface is −(image-side focal length)×(value obtained by subtracting the revolution angular velocity from the axial rotation angular velocity).

The output signal from the accelerometer 121 is also described. In an XY coordinate plane, the revolution angular velocity at the principal point A: $\theta'_{axy}=\int$(acceleration component orthogonal to a line segment $r_{axy}$ at the point A)$dt/r_{axy}$. To that end, an acceleration vector $\uparrow R_a$ may be calculated as measured. In this embodiment, the accelerometer 121 is fixed at the point B, and hence the acceleration value at the point A needs to be subjected to the correction calculation based on the output from the accelerometer at the point B. Here, a difference value between the acceleration values at the principal point A and at the point B at which the accelerometer 121 is actually located and a theoretical acceleration value at the point B are obtained. Then, components (terms) unnecessary for image shake control are made clear.

First, in the fixed coordinate system O-XY, an acceleration vector $\uparrow R_{a(O-XY)}$ generated at the principal point A is obtained by the following Equation 17.

$$\uparrow \ddot{R}_{a(O-XY)} = \ddot{r}_{axy} e^{j\theta_{axy}}($$ <Equation 17> first term: acceleration component indicating a change in length $r_a$) +

$r_{axy}(\theta'_{axy})^2 e^{j(\theta axy+\Pi)}$ (second term: centripetal force component) +

$r_{axy}\ddot{\theta}_{axy} e^{j(\theta axy+\Pi/2)}$ (third term: angular acceleration component) +

$2r'_{axy}\theta'_{axy} e^{j(\theta axy+\Pi/2)}$ (fourth term: Coriolis force component) +

$G \cdot e^{j(\theta gxy-\Pi)}$ (acceleration component of a gravity G)

(Here, the gravity G acts as a reaction force with respect to the accelerometer 121, and hence 180 degrees are subtracted from the angle $\theta_{gxy}$ indicating a gravity direction.)

In the fixed coordinate system O-XY, a relative acceleration vector $\uparrow R_{baxy(O-XY)}$ of the point B with reference to the principal point A is obtained. First, a relative position vector $\uparrow R_{baxy(O-XY)}$ is obtained by the following Equation 18.

$$\uparrow R_{baxy(O-XY)} = r_{ba} e^{j(\theta ba+\theta ca)}$$

By differentiating Equation 18 with respect to the time t to obtain the first-order differentiation, the velocity vector is obtained.

The points A and B are fixed at the same rigid body. Therefore, a relative velocity vector $\uparrow R_{baxy(O-XY)}$ is obtained by the following Equation 19 based on $r_{baxy}$=(constant value), $r'_{baxy}$=zero, $\theta_{baxy}$=(constant value), $e'_{baxy}$=zero, and $\theta'_{caxy}$= (axial rotation component) (variable).

$$\uparrow R'_{baxy(O-XY)} = \ddot{r}_{baxy} e^{j(\theta baxy+\theta caxy)}$$ <Equation 19>

$r_{baxy}(\theta'_{baxy} + \theta'_{caxy}) e^{j(\theta baxy+\theta caxy+\Pi/2)}$ $= (\text{zero}) e^{j\theta baxy} + r_{baxy}(\text{zero} + \theta'_{caxy})$ $e^{j(\theta baxy+\theta caxy+\Pi/2)}$ $= r_{baxy}(\theta'_{caxy}) e^{j(\theta baxy+\theta caxy+\Pi/2)}$ Next, the acceleration vector is obtained. In the fixed coordinate system O-XY, the relative acceleration vector $\uparrow R_{baxy(O-XY)}$ of the point B (position of the accelerometer) with reference to the point A is obtained by the following Equation 20.

$$\uparrow \ddot{R}_{baxy(O-XY)} = \ddot{r}_{baxy} e^{j(\theta baxy+\theta caxy)} + r_{baxy}(\theta'_{baxy} + \theta'_{caxy})^2$$ <Equation 20>

$e^{j(\theta baxy+\theta caxy+\Pi)} + r_{baxy}(\ddot{\theta}_{baxy} + \ddot{\theta}_{caxy})$ $e^{j(\theta baxy+\theta caxy+\Pi/2)} +$ $2r'_{baxy}(\theta'_{baxy} + \theta'_{caxy}) e^{j(\theta baxy+\theta caxy+\Pi/2)}$ $= (\text{zero}) e^{j(\theta baxy+\theta caxy)} + r_{baxy}(\text{zero} + \theta'_{caxy})^2$ $e^{j(\theta baxy+\theta caxy+\Pi)} + r_{baxy}(\text{zero} + \ddot{\theta}_{caxy})$ $e^{j(\theta baxy+\theta caxy+\Pi/2)} + 2(\text{zero})(\text{zero} + \theta'_{caxy})$ $e^{j(\theta baxy+\theta caxy+\Pi/2)}$ $= r_{baxy}(\theta'_{caxy})^2 e^{j(\theta baxy+\theta caxy+\Pi)} + r_{baxy}(\ddot{\theta}_{caxy})$ $e^{j(\theta baxy+\theta caxy+\Pi/2)}$ (=(centripetal force)+(angular acceleration component))

The equation value corresponds to a movement vector error because of the position B to which the accelerometer 121 is not actually attached with reference to the principal point A of the ideal position.

The acceleration $\uparrow R_{bxy(O-XY)}$ of the point B in the fixed coordinate system O-XY is expressed by a combined total of the already-obtained vector from the original point O to the principal point A and the vector from the principal point A to the point B. First, a position vector $\uparrow R_{bxy}$ of the point B in the fixed coordinate system O-XY is expressed by the following Equation 21 through the principal point A.

The position vector: <Equation 21>

$\uparrow R_{bxy(O-XY)} = r_{bxy} e^{j\theta bxy}$ $= \uparrow R_{axy} + \uparrow R_{baxy}$ $= r_{axy} e^{j\theta axy} + r_{baxy} e^{j(\theta baxy+\theta caxy)}$ The velocity vector: <Equation 22>

$\uparrow R'_{bxy(O-XY)} = r'_{bxy} e^{j\theta bxy} + r_{bxy}\theta'_{bxy} e^{j(\theta bxy+\Pi/2)}$ $= \uparrow R'_{axy} + \uparrow R'_{baxy}$ $= r'_{axy} e^{j(\theta axy)} + r_{axy}\theta'_{axy} e^{j(\theta axy+\Pi/2)} +$ $r_{baxy}(\theta'_{caxy}) e^{j(\theta baxy+\theta caxy+\Pi/2)}$ -continued The acceleration vector:  $\qquad$ < Equation 23 >

$$\uparrow \ddot{R}_{bxy(O-XY)} = \uparrow \ddot{R}_{axy} + \uparrow \ddot{R}_{baxy}$$
$$= \ddot{r}_{axy} e^{j\theta_{axy}} + r_{axy}(\theta'_{axy})^2 e^{j(\theta_{axy}+\Pi)} +$$
$$r_{axy} \ddot{\theta}_{axy} e^{j(\theta_{axy}+\Pi/2)} + 2 r'_{axy} \theta'_{axy}$$
$$e^{j(\theta_{axy}+\Pi/2)} + r_{baxy}(\theta'_{caxy})^2$$
$$e^{j(\theta_{baxy}+\theta_{caxy}+\Pi)} + r_{baxy}(\ddot{\theta}_{caxy}) e^{j(\theta_{baxy}+\theta_{caxy}+\Pi/2)} +$$
$$G \cdot e^{j(\theta_{gxy}-\Pi)}$$

Subsequently, the acceleration $\uparrow R_{bxy(O2-X2Y2)}$ of the point B in the moving coordinate system $O_2$-$X_2Y_2$ is calculated. This is because a size (scalar) of the acceleration to be calculated is the fixed coordinate system O-XYZ in which the subject exists. This is also because the acceleration is fixed with respect to the moving coordinate system $O_2$-$X_2Y_2$, the three axes of the accelerometer 121 are directed in the $X_2$ axis direction, the $Y_2$ axis direction, and the $Z_2$ axis direction, and the acceleration component needs to be expressed by a coordinate axis direction of the moving coordinate system $O_2$-$X_2Y_2Z_2$.

A layout state of the accelerometer 121. The accelerometer 121 of a three-axis output is located at the point B is described in detail. In the moving coordinate system $O_2$-$X_2Y_2Z_2$, the axes of the accelerometer are set to an accelerometer output $A_{ccx2}$ having a sensitivity direction in parallel with the $X_2$ axis, an accelerometer output $A_{ccy2}$ having a sensitivity direction in parallel with the $Y_2$ axis, and an accelerometer output $A_{ccz2}$ having a sensitivity direction in parallel with the $Z_2$ axis. Here, the movement in the XY plane is described, and hence the accelerometer output $A_{ccx2}$ and the accelerometer output $A_{ccy2}$ are described.

The acceleration $\uparrow R_{bxy(O-XY)}$ of the point B in the fixed coordinate system O-XY obtained above is converted into the $X_2$ axis direction component and the $Y_2$ axis direction component without changing the original point O. In order to obtain $\beta R_{bxy(O-X2Y2)}$, the coordinate conversion may be performed in a direction opposite to the axial rotation angle $\theta_{caxy}$ of the camera. Therefore, the following Equation 24 is obtained.

An accelerometer output:  $\qquad$ <

$$\uparrow A_{cc(O-X2Y2)} = \uparrow \ddot{R}_{bxy(O-XY)} e^{j(-\theta_{caxy})}$$
$$= \ddot{r}_{axy} e^{j(\theta_{axy}-\theta_{caxy})}$$

(first term: focus shake) +

$$r_{axy}(\theta'_{axy})^2 e^{j(\theta_{axy}-\theta_{caxy}+\Pi)}$$

(second term: centripetal force of revolution) +

$$r_{axy} \ddot{\theta}_{axy} e^{j(\theta_{axy}-\theta_{caxy}+\Pi/2)}$$

(third term: acceleration of revolution) +

$$2 r'_{axy} \theta'_{axy} e^{j(\theta_{axy}-\theta_{caxy}+\Pi/2)}$$

(fourth term: Coriolis force) +

$$r_{baxy}(\theta'_{caxy})^2 e^{j(\theta_{baxy}+\theta_{caxy}-\theta_{caxy}+\Pi)}$$

(fifth term: centripetal force of axial rotation) +

$$r_{baxy}(\ddot{\theta}_{caxy}) e^{j(\theta_{baxy}+\theta_{caxy}-\theta_{caxy}+\Pi/2)}$$

(sixth term: acceleration of axial rotation) +

$$G \cdot e^{j(\theta_{gxy}-\Pi-\theta_{caxy})}$$

(seventh term: gravity acceleration component)

By substituting the approximation conditions thereinto, the approximation equation is obtained. Such limitation conditions are set that the revolution angular velocity $\theta'_{axy}$ and the axial rotation angular velocity $\theta'_{caxy}$ exhibit minute vibrations (±) about zero, $\theta_{axy} \approx$ zero, and $\theta_{caxy} \approx$ zero. Further, it is assumed that the scalar $r_{axy}$ is caused to change minutely, $r'_{axy}$=(limited value), $r_{axy}$=(limited value), and $\theta_{baxy}$ is approximately within $\pi/2 \pm \pi/4$.

The accelerometer output:  $\qquad$ < Equation 25 >

$$\uparrow A_{cc2(O-X2Y2)} =$$

$$\uparrow \ddot{R}_{bxy(O-XY)} e^{j(-\theta_{caxy})} \approx \ddot{r}_{axy} e^{j(zero-zero)} \text{(first term: focus shake)} + r_{axy}(\theta'_{axy})^2$$

$$e^{j(zero-zero+\Pi)} \text{(second term: centripetal force of revolution)} +$$

$$r_{axy} \ddot{\theta}_{axy} e^{j(zero-zero+\Pi/2)}$$

(third term: acceleration of revolution) + $2 r'_{axy} \theta'_{axy} e^{j(zero-zero+\Pi/2)}$ (fourth term: Coriolis force) + $r_{baxy}(\theta'_{caxy})^2 e^{j(\theta_{baxy}+zero+\Pi)}$ (fifth term: centripetal force of axial rotation) +

$r_{baxy}(\ddot{\theta}_{caxy}) e^{j(\theta_{baxy}+zero+\Pi/2)}$ (sixth term: acceleration of axial rotation) + $G \cdot e^{j(\theta_{gxy}-\Pi-zero)}$ (seventh term: gravity acceleration component)

The real number part is the output $A_{ccx2}$ from the accelerometer in the $X_2$ axis direction, and the imaginary number part is the output $A_{ccy2}$ from the accelerometer in the $Y_2$ axis direction. The above-mentioned polar coordinate system representation is decomposed into an $X_2$ component and a $Y_2$ component of an orthogonal coordinate system representation.

The output from the accelerometer in the $X_2$ direction:

< Equation 26 >

$$A_{ccx2(O-X2Y2)} \approx \ddot{r}_{axy}(\text{first term: focus shake}) -$$
$$r_{axy}(\theta'_{axy})^2 (\text{second term: centripetal force of revolution}) + r_{baxy}(\theta'_{caxy})^2$$
$$\cos(\theta_{baxy} + \Pi)(\text{fifth term: centripetal force of axial rotation}) +$$
$$r_{baxy}\ddot{\theta}_{caxy}\cos(\theta_{baxy} + \Pi/2)(\text{sixth term: accelertation of axial rotation}) +$$
$$G \cdot \cos(\theta_{gxy} - \Pi)(\text{seventh term: gravity acceleration component})$$

Only the first term $r_{axy}$ is necessary for the focus shake correction in Equation 26. The second term and fifth to seventh terms are the components unnecessary for the focus shake correction, and if not eliminated, become error components in obtaining the acceleration $r_{axy}$ in the $X_2$ axis direction being the optical axis. The second and fifth to seventh terms can be eliminated by the same method as the following Equation 27. In addition, it is required to obtain values of $r_{axy}$ and $\theta'_{axy}$ included within the second term so as to delete the second term (centripetal force of revolution). The value of $r_{axy}$ is nearly equal to a focal length $((1+\beta)f/\beta)$ to the subject ($\beta$ is an image magnification). In the recent image taking apparatus, it is provided a focus encoder for detecting a moved position of AF lens 140. The distance to the object is easily calculated in accordance with an output value of the focus encoder in focus state. As the result, the value of $r_{axy}$ can be obtained. As for the revolution angular velocity $\theta'_{axy}$, a value obtained by following equation 27 is used.

The ouput from the accelerometer in the $Y_2$ direction:

< Equation 27 >

$$A_{ccy2(O-X2Y2)} \approx jr_{axy}\ddot{\theta}_{axy}(\text{third term: acceleration of revolution}) +$$
$$j2\dot{r}_{axy}\theta'_{axy}(\text{fourth term: Coriolis force}) + jr_{baxy}(\theta'_{caxy})^2$$
$$\sin(\theta_{baxy} + \Pi)(\text{fifth term: centripetal force of axial rotation}) +$$
$$jr_{baxy}\ddot{\theta}_{caxy}\sin(\theta_{baxy} + \Pi/2)(\text{sixth term: acceleration of axial rotation}) +$$
$$jG \cdot \sin(\theta_{gxy} - \Pi)(\text{seventh term: gravity acceleration component})$$

The respective terms of the output $A_{ccy2(O-X2Y2)}$ from the accelerometer in the $Y_2$ axis direction is described. The third term $jr_{axy}\theta_{axy}$ represents the component necessary to obtain the revolution angular velocity $\theta'_{axy}$ to be obtained in this embodiment. The revolution angular velocity $\theta'_{axy}$ is obtained by dividing the third term by known $r_{axy}$ and integrating the resultant. The fourth term $j2\dot{r}'_{axy}\theta'_{axy}$ represents the Coriolis force, being the term that can be ignored because $\dot{r}'_{axy} \approx$ zero if the shake due to the optical axis direction of the camera is small in amount. The fifth and sixth terms are the error components included in the output $A_{ccy2(O-X2Y2)}$ from the accelerometer because the accelerometer 121 cannot be located in the ideal position of the principal point A and is located at the point B instead.

The fifth term $jr_{baxy}(\theta'_{caxy})^2 \sin(\theta_{baxy}+\pi)$ represents the centripetal force generated due to the accelerometer 121 revolving about the principal point A. The values $r_{baxy}$ and $\theta_{baxy}$ are the coordinates of the point B to which the accelerometer 121 is attached, and are known. The value $\theta'_{caxy}$ the axial rotation angular velocity, being the value that can be measured by the angular velocity sensor 130 attached to the camera. Therefore, the value of the fifth term can be calculated.

The sixth term $jr_{baxy}\ddot{\theta}_{caxy} \sin(\theta_{baxy}+\pi/2)$ represents the acceleration component for a case where the accelerometer 121 revolves about the principal point A. The values $r_{baxy}$ and $\theta_{baxy}$ are the coordinates of the point B to which the accelerometer 121 is attached, and are known. The value $\ddot{\theta}_{caxy}$ can be calculated by differentiating the value of the angular velocity sensor 130 attached to the camera. Therefore, the value of the sixth term can be calculated.

The seventh term $jG \cdot \sin(\theta_{gxy}-\pi)$ represents the influence of the gravity acceleration, and can be used as the constant in the approximation equation. Therefore, the seventh term can be eliminated by the filtering process of the circuit.

As described above, the output $A_{ccy2(O-X2Y2)}$ from the accelerometer in the $Y_2$ axis direction includes components unnecessary for the revolution angular velocity $\theta'_{axy}$ to be obtained in the present invention. In spite thereof, it is made clear that the necessary revolution angular velocity $\theta'_{axy}$ can be obtained by subtracting the unnecessary components according to the calculation based on the output from the angular velocity sensor 130 located in the camera and the information on the position to which the accelerometer 121 is attached with reference to the principal point A.

In the same manner, the focus shake velocity $r'_{axy}$ substantially in the optical axis direction of the camera is to be calculated based on the output $A_{ccx2(O-X2Y2)}$ from the accelerometer in the $X_2$ direction. The first term $r_{axy}$ corresponds to the acceleration of the focus shake. The second and fifth to seventh terms can be eliminated for the same reason as described with regard to the output $A_{ccy2(O-X2Y2)}$ from the accelerometer in the $Y_2$ axis direction. Therefore, the focus shake velocity $r'_{axy}$ substantially in the optical axis direction of the camera can be obtained based on the output $A_{ccx2(O-X2Y2)}$ from the accelerometer in the $X_2$ direction.

In the first embodiment, when the ratio of the revolution angular velocity to the axial rotation angular velocity is 0.1 or less, the revolution angular velocity is sufficiently smaller than the axial rotation angular velocity. Therefore, image shake correction calculation can be simplified by performing only the correction of the axial rotation shake, which leads to higher speed and lower power consumption.

Further, when the full depression is operated on the release button (not shown) to start the exposure for the image taking, the real-time revolution angular velocity is estimated by multiplying the past ratio of the revolution angular velocity to the axial rotation angular velocity by the real-time axial rotation angular velocity. This prevents a revolution acceleration value that is largely erroneous from being used even when the output from the accelerometer 121 falls into disorder due to shutter shock upon the image taking or operation vibrations of the camera, which allows the image shake correction with stability. Further, by newly employing exact modeling and formulation such as an axial rotation shake and a revolution shake for the angle shake and the parallel shake, such accurate image shake correction that control thereof does not fail no matter how the two shake components coexist can be performed. Further, the image shake correction is performed based on the difference between the axial rotation angular velocity and the revolution angular velocity, which can reduce an amount of calculation processing after the calculation of the difference. Further, the axial rotation shake and the revolution shake having the same units (for example, rad/second) facilitate the calculation. Further, the image shake on the image pickup surface of the image pickup element 203 and the focus shake in the optical axis direction can be represented by the same equation, which allows the image shake correction calculation and the focus shake correction calculation to be performed at the same time.

Second Embodiment

Figures 15, 15A:
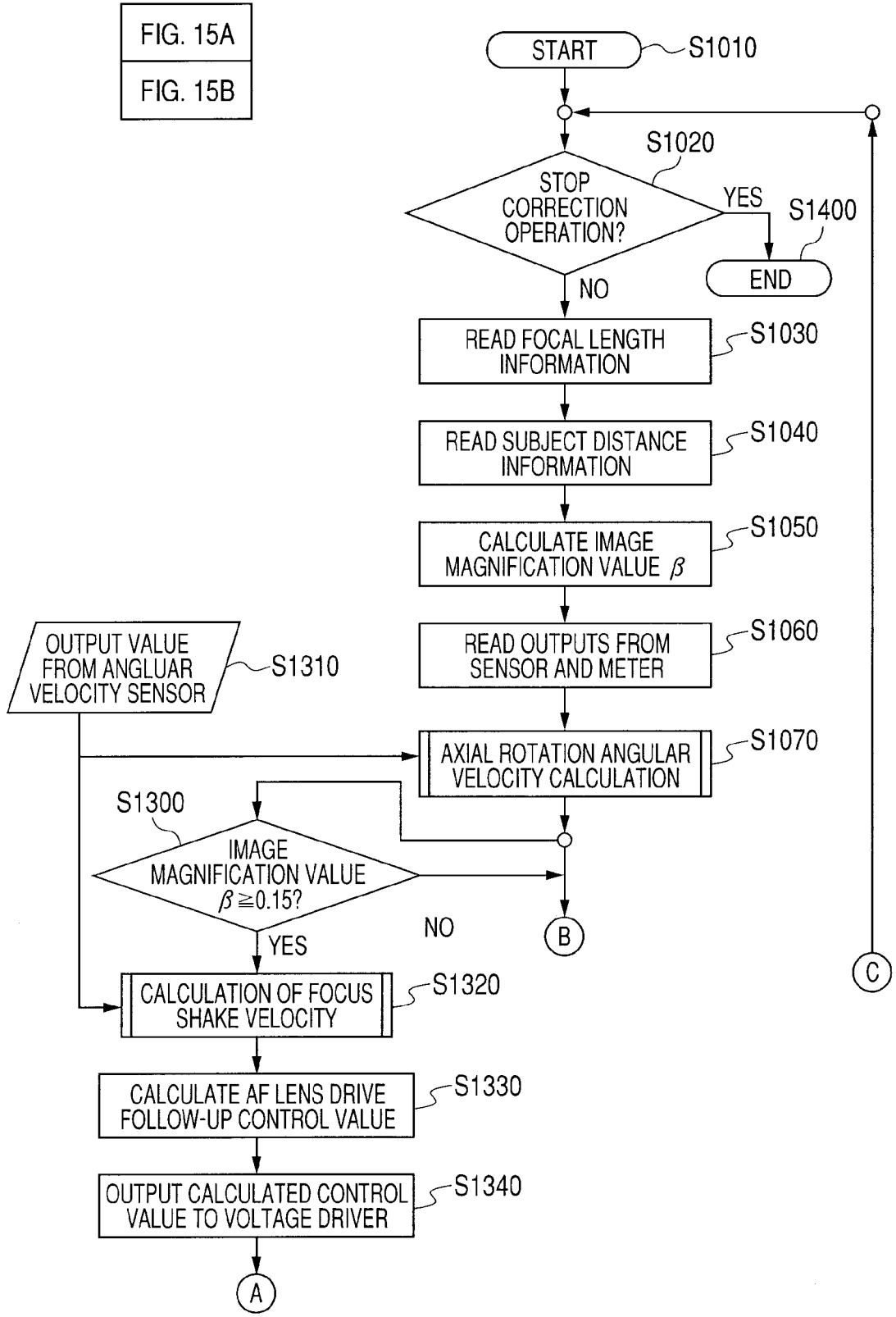
FIG. 15 is comprised of FIGS. 15A and 15B showing flowcharts illustrating an operation of an image pickup apparatus according to a second embodiment of the present invention.
Figure 15B:
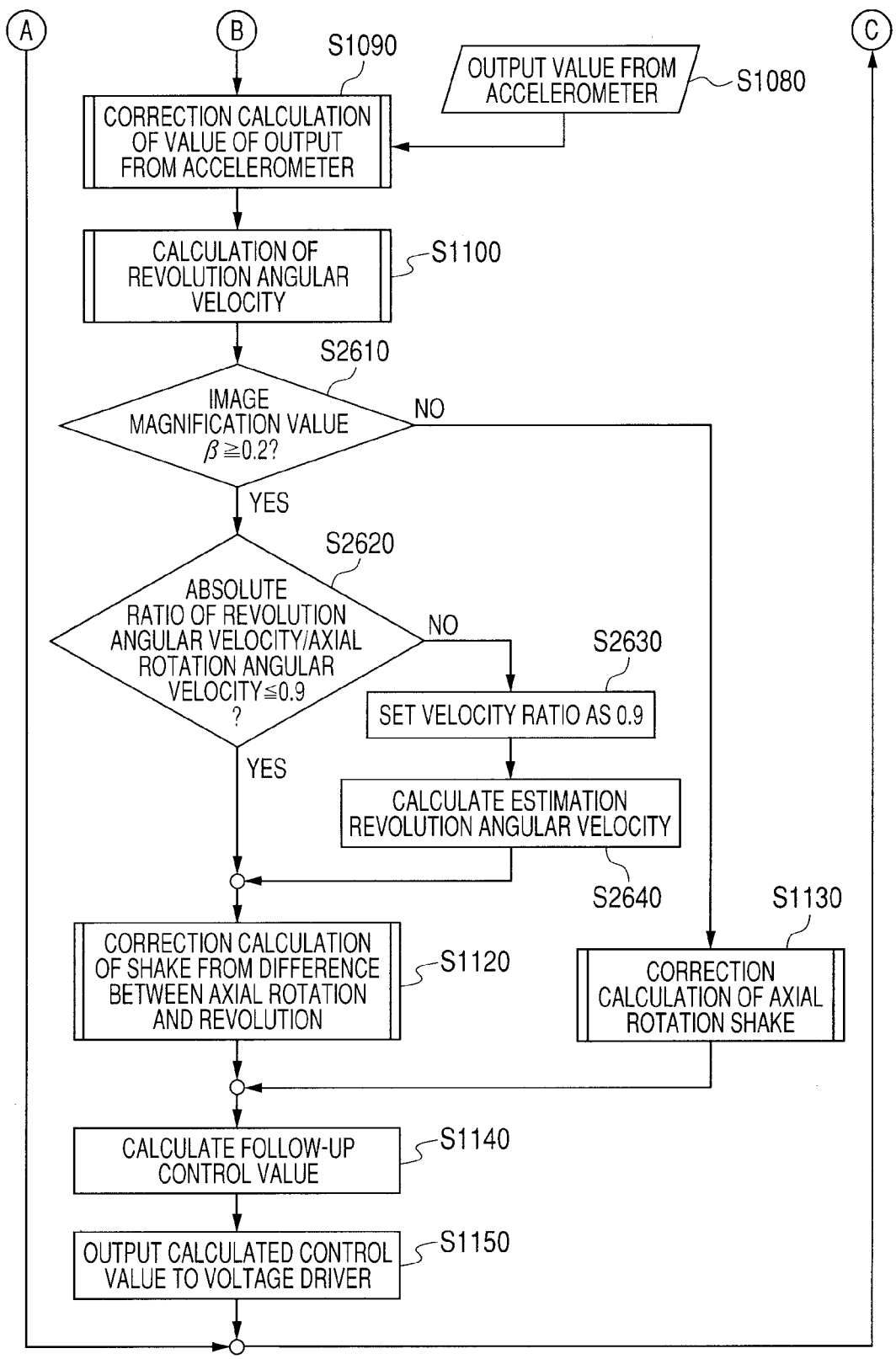
Figure 16:
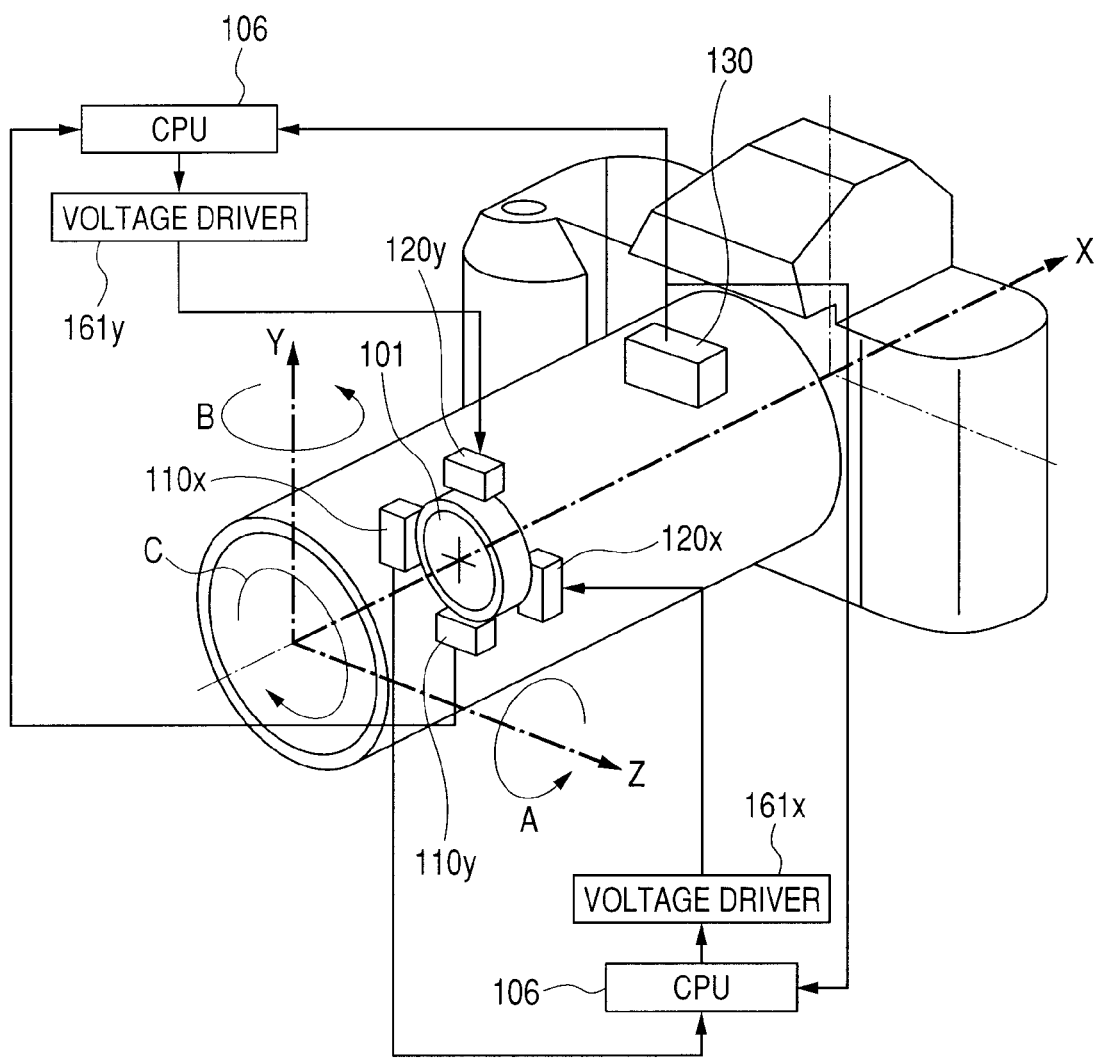
FIG. 16 is a diagram illustrating an image shake correction apparatus of a camera according to a conventional example.
Figure 17A:
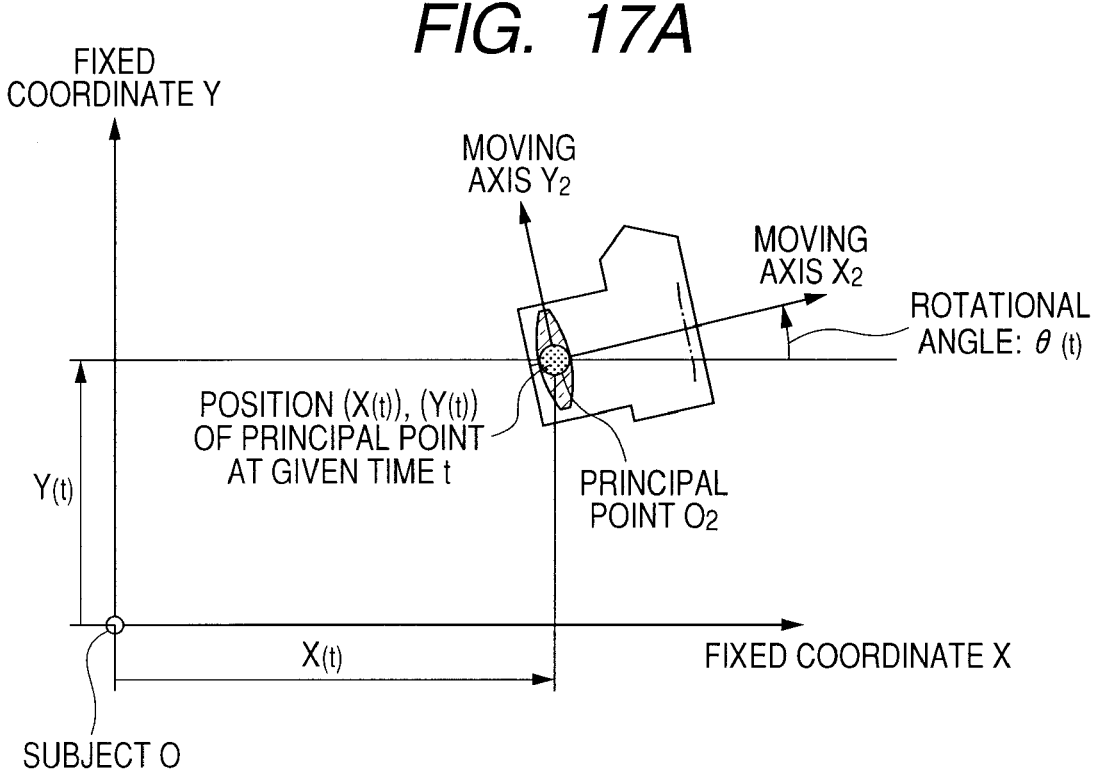
FIGS. 17A and 17B are diagrams illustrating a general definition of an object position and an object velocity in a two-dimensional coordinate system.
Figure 17B:
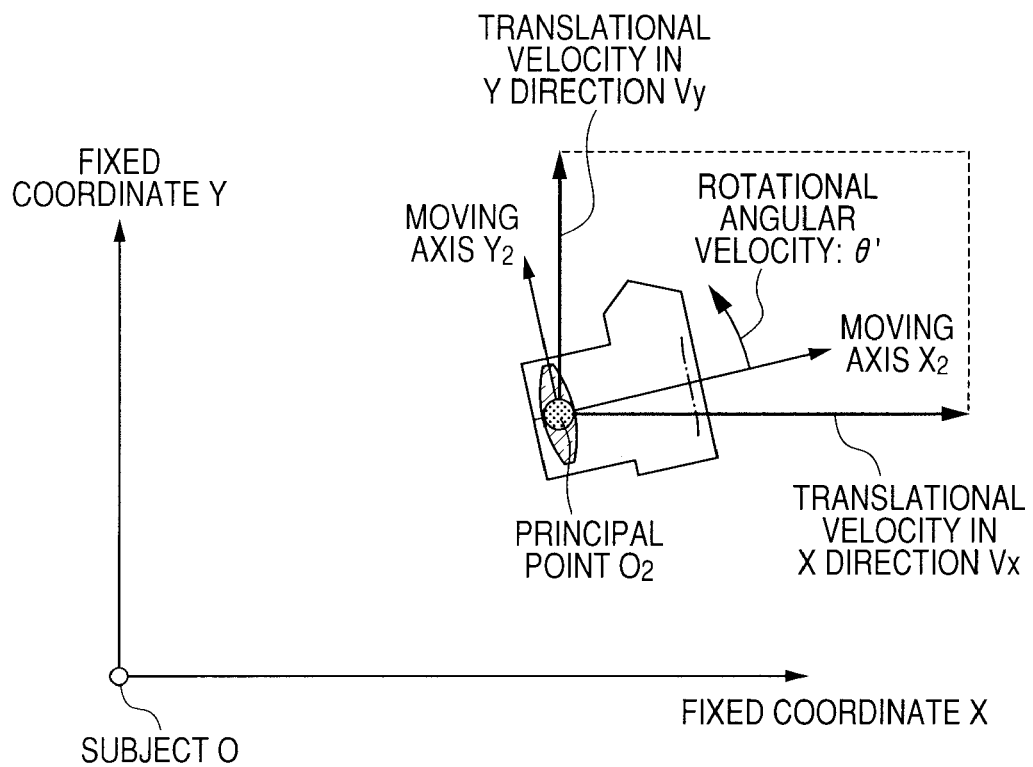
Figure 18:
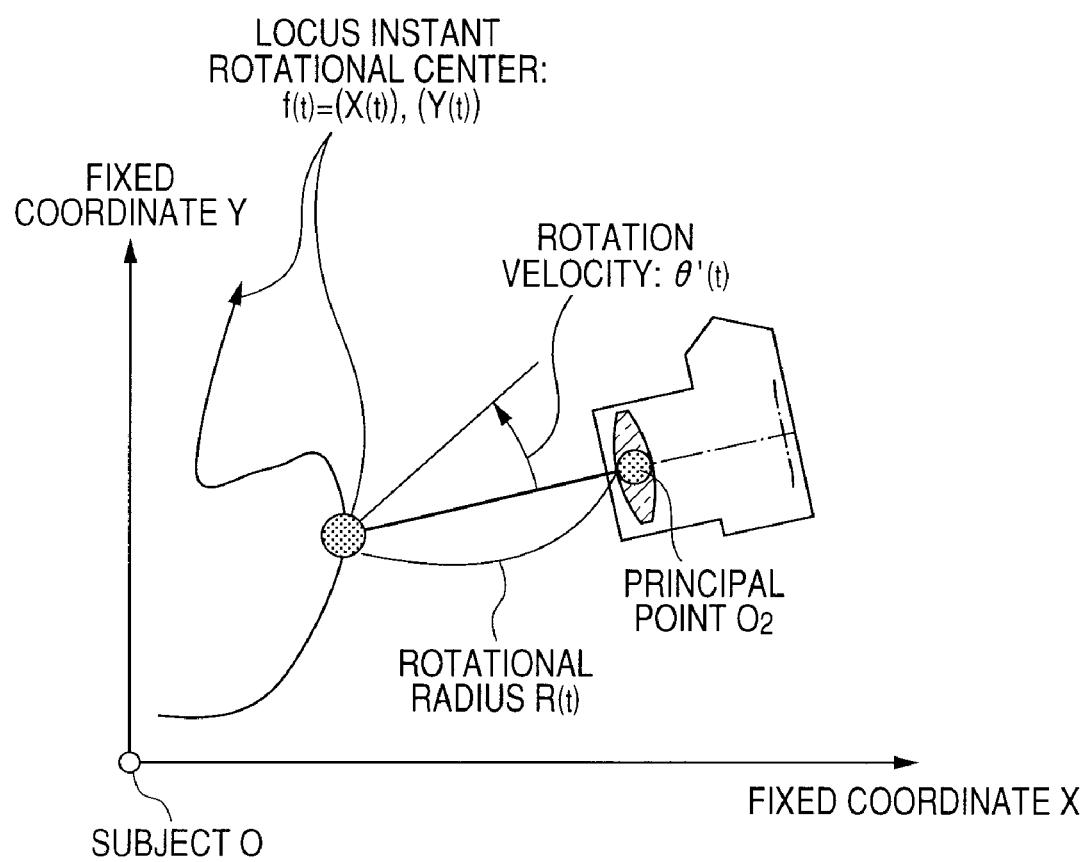
FIG. 18 is a diagram illustrating a general definition of a locus of an instant rotational center.

With reference to FIGS. 15A and 15B, the second embodiment is described. FIGS. 15A and 15B have the same flow as FIGS. 3A and 3B according to the first embodiment. Hence, the same steps are denoted by the same reference symbols, and description thereof is omitted.

In FIGS. 15A and 15B, after the revolution angular velocity calculation in S1100, the procedure advances to S2610. In S2610, it is determined whether or not the image taking magnification is equal to or larger than 0.2 (equal to or larger than a predetermined value). If the image taking magnification is equal to or larger than 0.2, the procedure advances to S2620. If the image taking magnification is smaller than 0.2 (smaller than the predetermined value), the procedure advances to S1130. In S1130, the correction calculation of the axial rotation shake is performed in the same manner as in the first embodiment.

In S2620, it is determined whether or not the absolute ratio of the revolution angular velocity to the axial rotation angular velocity is equal to or smaller than 0.9 (predetermined value). If the absolute ratio is equal to or smaller than 0.9, the procedure advances to S1120. If the absolute ratio is larger than 0.9, the procedure advances to S2630.

In S2630, an angular velocity ratio is fixed to (or stored as) a constant of 0.9 (specific constant). In the subsequent S2640, the current revolution angular velocity is calculated as estimated by multiplying the axial rotation angular velocity obtained in real time by the fixed angular velocity ratio of 0.9, and the procedure advances to the subsequent S1120. In S1120, the correction calculation of the shake from the difference between the axial rotation and the revolution is performed in the same manner as in the first embodiment.

In the second embodiment, when the image magnification is smaller than 0.2, the revolution angular velocity is sufficiently smaller than the axial rotation angular velocity. Therefore, the image shake correction calculation can be simplified by performing only the correction of the axial rotation shake, which leads to higher speed and lower power consumption. Further, the ratio of the revolution angular velocity to the axial rotation angular velocity rarely exceeds 1. If the absolute ratio exceeds 0.9, the ratio is fixed to the constant 0.9 to thereby prevent the correction from being performed erroneously to an excessive degree.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-092862, filed Apr. 7, 2009, which is hereby incorporated by reference herein in its entirety.

What is claimed is:

1. An image blur compensation apparatus, comprising:
an image taking optical system for taking an image of a subject;
an angular velocity detection unit for detecting an angular velocity based on a shake of the apparatus;
an acceleration detection unit for detecting an acceleration based on the shake of the apparatus;
a first angular velocity calculation unit for calculating a first angular velocity component about the image taking optical system based on the detection result from the angular velocity detection unit;
a second angular velocity calculation unit for calculating a second angular velocity component about the subject based on a detection result by the acceleration detection unit and the first angular velocity component calculated by the first angular velocity calculation unit; and
a control unit for performing image blur compensation control based on a difference between the first angular velocity component and the second angular velocity component.

2. An image blur compensation shake correction apparatus according to claim 1,
wherein the first angular velocity calculation unit calculates the first angular velocity component around a first point which is a principal point of the image taking optical system, and
wherein the second angular velocity calculation unit calculates the second angular velocity component around a second point which is the subject.

3. An image pickup apparatus, comprising the image blur compensation apparatus according to claim 1.

4. An optical apparatus, comprising the image blur compensation apparatus according to claim 1.

5. An image blur compensation shake correction apparatus, comprising:
an image taking optical system for taking an image of a subject;
an angular velocity detection unit for detecting an angular velocity based on a shake of the apparatus;
an acceleration detection unit for detecting an acceleration based on a shake of the apparatus;
an axial rotation angular velocity calculation unit for calculating an axial rotation angular velocity component about a principal point of the image taking optical system based on a detection result from the angular velocity detection unit;

a revolution angular velocity calculation unit for calculating a revolution angular velocity component about the subject based on a detection result from the acceleration detection unit and the axial rotation angular velocity component calculated by the axial rotation angular velocity calculation unit; and a control unit for performing image blur compensation control based on a difference between the axial rotation angular velocity component and the revolution angular velocity component.

6. An image blur compensation apparatus according to claim 5, further comprising a difference value calculation unit for calculating a difference value between an axial rotation and a revolution based on the difference between the axial rotation angular velocity component and the revolution angular velocity component, wherein the control unit performs the image blur compensation control based on the difference value between the axial rotation and the revolution.

7. An image blur compensation apparatus according to claim 6, further comprising a ratio calculation unit for calculating a ratio between an axial rotation angular velocity and a revolution angular velocity, which is a ratio of the revolution angular velocity component to the axial rotation angular velocity component, wherein the revolution angular velocity calculation unit calculates the revolution angular velocity component as estimated based on a product of the axial rotation angular velocity component calculated in real time and the ratio between the axial rotation angular velocity and the revolution angular velocity which is calculated by the ratio calculation unit, wherein the control unit performs the image blur compensation control based on the difference value between the axial rotation and the revolution when the ratio between the axial rotation angular velocity and the revolution angular velocity is larger than a predetermined value, and performs the image blur compensation control based on the axial rotation angular velocity component when the ratio between the axial rotation angular velocity and the revolution angular velocity is equal to or smaller than the predetermined value.

8. An image blur compensation apparatus according to claim 6, wherein the control unit performs the image blur compensation control based on the difference value between the axial rotation and the revolution when an image magnification of the image taking optical system is equal to or larger than a predetermined value, and performs the image blur compensation control based on the axial rotation angular velocity component when the image magnification of the image taking optical system is smaller than the predetermined value.

9. An image blur compensation apparatus according to claim 5, further comprising a ratio calculation unit for calculating a ratio between an axial rotation angular velocity and a revolution angular velocity, which is a ratio of the revolution angular velocity component to the axial rotation angular velocity component, wherein the revolution angular velocity calculation unit calculates the revolution angular velocity component as estimated based on a product of the axial rotation angular velocity component calculated in real time and the ratio between the axial rotation angular velocity and the revolution angular velocity which is calculated by the ratio calculation unit.

10. An image blur compensation apparatus according to claim 9, wherein the ratio calculation unit sets the ratio between the axial rotation angular velocity and the revolution angular velocity to a specific constant if the ratio between the axial rotation angular velocity and the revolution angular velocity exceeds a predetermined value.

11. An image blur compensation apparatus according to claim 9, wherein the control unit performs the image blur compensation control based on the difference value between the axial rotation and the revolution when an image magnification of the image taking optical system is equal to or larger than a predetermined value, and performs the image blur compensation control based on the axial rotation angular velocity component when the image magnification of the image taking optical system is smaller than the predetermined value.

12. An image blur compensation apparatus according to claim 5, further comprising:

an optical axis direction acceleration detection unit for detecting an optical axis direction component included in the acceleration applied to the image blur compensation apparatus; and an optical axis direction blur compensation control unit for correcting an optical axis direction component included in a shake applied to the image blur compensation apparatus, wherein the optical axis direction blur compensation control unit performs optical axis direction blur compensation control based on the optical axis direction component included in the acceleration.

13. An image pickup apparatus, comprising the image blur compensation apparatus according to claim 5.

14. An optical apparatus, comprising the image blur compensation apparatus according to claim 5.

15. A control method of an image blur compensation apparatus, which comprises an image taking optical system for taking an image of a subject, the method comprising:

detecting an angular velocity based on a shake of the apparatus;

detecting an acceleration based on the shake of the apparatus;

calculating a first angular velocity component about the image taking optical system based on the angular velocity detection result;

calculating a second angular velocity component about the subject based on an acceleration detection result and the first angular velocity component; and performing image blur compensation control based on a difference between the first angular velocity component and the second angular velocity component.

16. A method according to claim 15, further comprising:

calculating the first angular velocity component around a first point which is a principal point of the image taking optical system, and calculating the second angular velocity component around a second point which is the subject.

* * * * *